(12) United States Patent
Mukaijima et al.

(10) Patent No.: US 6,452,741 B1
(45) Date of Patent: Sep. 17, 2002

(54) MAGNETIC RECORDING DEVICE WITH DEFORMATION-PROOF ELEMENT

(75) Inventors: Katsutoshi Mukaijima; Maki Wakita; Shoji Takahashi, all of Tokyo (JP)

(73) Assignees: Iomega Corporation, Roy, UT (US); Citizen Watch Company, Ltd., Tokyo (JP)

(*) Notice: Subject to any disclaimer, the term of this patent is extended or adjusted under 35 U.S.C. 154(b) by 0 days.

(21) Appl. No.: 09/485,763

(22) Filed: Feb. 15, 2000

(30) Foreign Application Priority Data

| Jun. 16, 1998 | (JP) | 10/167945 |
| Oct. 19, 1998 | (JP) | 10/313942 |
| Dec. 9, 1998 | (JP) | 10/366047 |

(51) Int. Cl.[7] ............................................. G11B 33/12
(52) U.S. Cl. ...................................................... 360/99.06
(58) Field of Search ............................ 360/137, 97.01, 360/97.02, 97.03, 97.04, 98.01, 98.02, 98.03, 98.04, 98.05, 98.06, 98.07, 98.08, 99.01, 99.02, 99.03, 99.04, 99.05, 99.06, 99.07, 99.08, 99.09, 99.1, 99.11, 99.12; 361/685

(56) References Cited

U.S. PATENT DOCUMENTS

| 5,587,855 | A | | 12/1996 | Kim ........................ 360/97.02 |
| 5,898,539 | A | * | 4/1999 | Yokota et al. ........... 360/99.06 |
| 6,005,755 | A | * | 12/1999 | Muse et al. ................. 360/133 |
| 6,025,973 | A | * | 2/2000 | Mizoshita et al. ....... 360/98.08 |
| 6,052,255 | A | * | 4/2000 | Kawabe et al. .......... 360/97.02 |
| 6,172,841 | B1 | * | 1/2001 | Kobayashi ................. 360/96.5 |
| 6,185,069 | B1 | * | 2/2001 | Schick ........................ 360/133 |

FOREIGN PATENT DOCUMENTS

| EP | 0 490 069 | 6/1992 |
| EP | 0 721 187 A2 | 7/1996 |
| EP | 0 739 013 | 10/1996 |
| JP | 59-94281 | 5/1984 |
| JP | 8-235719 | 9/1996 |
| JP | 8-273344 | 10/1996 |

* cited by examiner

*Primary Examiner*—Brian E. Miller
*Assistant Examiner*—Chen Tianjie

(57) ABSTRACT

A frame plate (19) is mounted to the inside of a case (4) of a magnetic recording device. (1), and a disk drive motor and a head body (5) are mounted to the frame plate (19). A member (88) for preventing the deformation of the case is provided between the case (4) and the frame plate (19). The member (88) is placed in a cartridge passing area by the action of a spring in the absence of the cartridge (2), but the member (88) is pressed with the front end of the cartridge (2) when the cartridge (2) is moved forward, the member (88) is forced to retreat to the outside of the cartridge passing area.

21 Claims, 18 Drawing Sheets

MAGNETIC RECORDING DEVICE WITH DEFORMATION-PROOF ELEMENT

TECHNICAL FIELD

This invention relates to a magnetic recording device for writing and reading information on and from a disk-shaped recording medium, and more particularly, to a magnetic recording device having a case incorporating a member for preventing the case of the magnetic recording device from being deformed by an external force.

BACKGROUND ART

A magnetic recording device which has a case incorporating a disk drive motor and a write/read head and drives a disk serving as a recording medium housed in a cartridge loaded into the case to write and read information on and from the disk is presently in use.

The magnetic recording device described above is equipped with a connector for making connection with a computer and needs to have an appearance of small-sized thin card type, particularly, to meet PCMCIA standard requirement. For that reason, the case is made of a thin material in order to reserve an inside space as large as possible.

When the cartridge is absent in the case of the magnetic recording device on the contrary, the space is left on the inside of the case. Thus, the deformation of the case is easily caused by the application of the external force to the case to thereby make the restoration of the case to its original shape impossible or to result in damages to inside mechanisms.

Accordingly, it is an object of the present invention to provide a small-sized thin magnetic recording device, which eliminates the possibility of easily deforming a case even when an external force is applied to the case.

DISCLOSURE OF THE INVENTION

A magnetic recording device according to the present invention comprises a case having a cartridge insertion opening in one end face to allow the insertion of a cartridge containing a disk serving as a recording medium, a frame plate mounted to the inside of the case, a disk drive motor mounted to the frame plate to drive the disk, a head body mounted to the flame plate to write information on the disk and/or read information from the disk, and a case deformation-proof member provided between the case and the frame plate and made movable between a cartridge passing area and an area outside the cartridge passing area. The case deformation-proof member is operated to be advanced up to a cartridge loading area when the cartridge is absent in the case, and to be retreated to the outside of the cartridge loading area when the cartridge is loaded into the case on the contrary.

The case deformation-proof member is energized by a spring so that it is advanced into the cartridge passing area. With the forward movement of the cartridge in the case, the case deformation-proof member is pressed with a front end face of the cartridge, so that it retreats to the outside of the cartridge passing area against the energizing force of the spring.

The case deformation-proof member includes a lever member having one end rotatably supported with a shaft provided on the frame plate and the other end serving as a free end.

The lever member as the case deformation-proof member continues to exert a force on the cartridge so as to push back the cartridge toward the cartridge insertion opening by the action of the spring while the cartridge is loaded in the case.

The case deformation-proof member includes a plate-shaped member extending in parallel to the cross direction of the case. The opposite ends of the plate-shaped member are supported with the opposite side walls of a case body such that the plate-shaped member may be pivoted freely between the position of a rising posture and the position of a fallen-down posture.

One or more pieces of reinforcing plates are locally bonded to a part of the inner surface of the case other than portions corresponding to the rotational or slide range of a rotational or slide member in the case.

BEST MODE FOR EMBODYING THE INVENTION

Outline of Magnetic Recording Device

Figure 1:
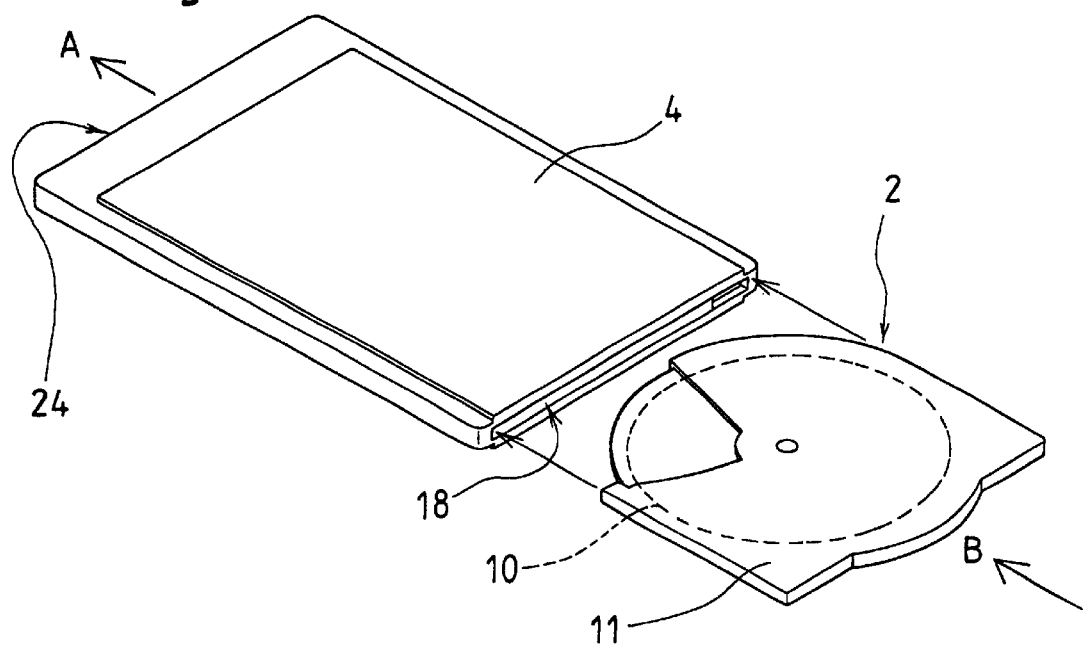
FIG. 1 is a perspective view showing a magnetic recording device and a cartridge according to one embodiment of the present invention.

A description will now be given of the outline of a magnetic recording device according to the present invention with reference to FIGS. 1 to 4.

A connector 24 for making connection with a computer body (not shown) is provided in the front of a magnetic recording device 1. With the forward movement of the magnetic recording device 1 in a direction shown by an arrow A in FIG. 1, the connector 24 is connected to a connector mounted to the computer body.

A cartridge insertion opening 18 for allowing the loading of a cartridge 2 is provided in the rear of a case 4 of the magnetic recording device 1.

The cartridge 2 is composed of a shell 11 and a recording medium (a disk 10) housed in the shell 11. The cartridge 2 is loaded into the magnetic recording device 1 in the manner of inserting the cartridge into the cartridge insertion opening 18 of the case 4 in a direction shown by an arrow B in FIG. 1.

Figure 2:
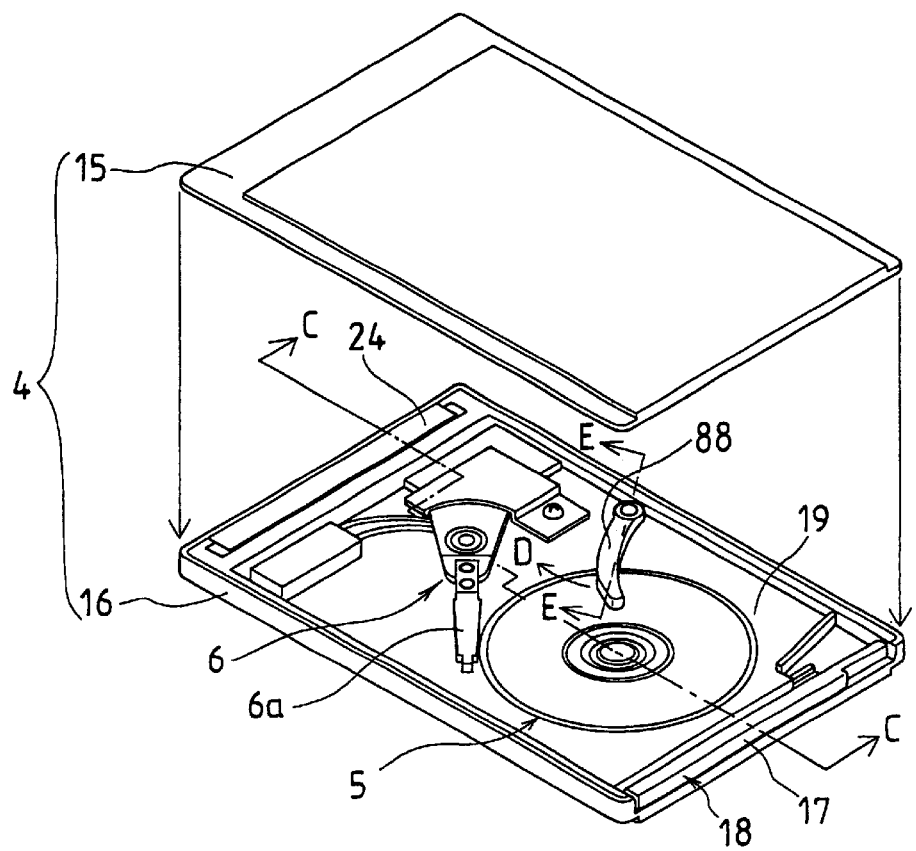
FIG. 2 is a view illustrating the magnetic recording device of FIG. 1, from which an upper cover is removed upward for the display of inside components on condition that the first embodiment of a case deformation-proof member is incorporated in the magnetic recording device.

As shown in FIG. 2, the case 4 of the magnetic recording device 1 incorporates a disk drive motor 5 for rotationally driving the disk 10 in the cartridge 2 and a write/read head body 6 for writing and reading information on and from the disk 10 in a place opposite to the disk 10.

The case 4 is composed of a lower cover 16 and an upper cover 15. The case 4 has a card-like appearance of a size meeting the standard requirement of Type II of PCMCIA.

A frame plate 19 is arranged in the substantial center in a height direction of a space defined by the lower cover 16 and the upper cover 15. The connector 24 is mounted to the front end of the frame plate 19. The disk drive motor 5 and the write/read head body 6 are further mounted to the frame plate.

A shutter 17 is mounted in the vicinity of the cartridge insertion opening 18 on the inside of the case 4 to allow opening or closing of the cartridge insertion opening 18.

Figure 3:
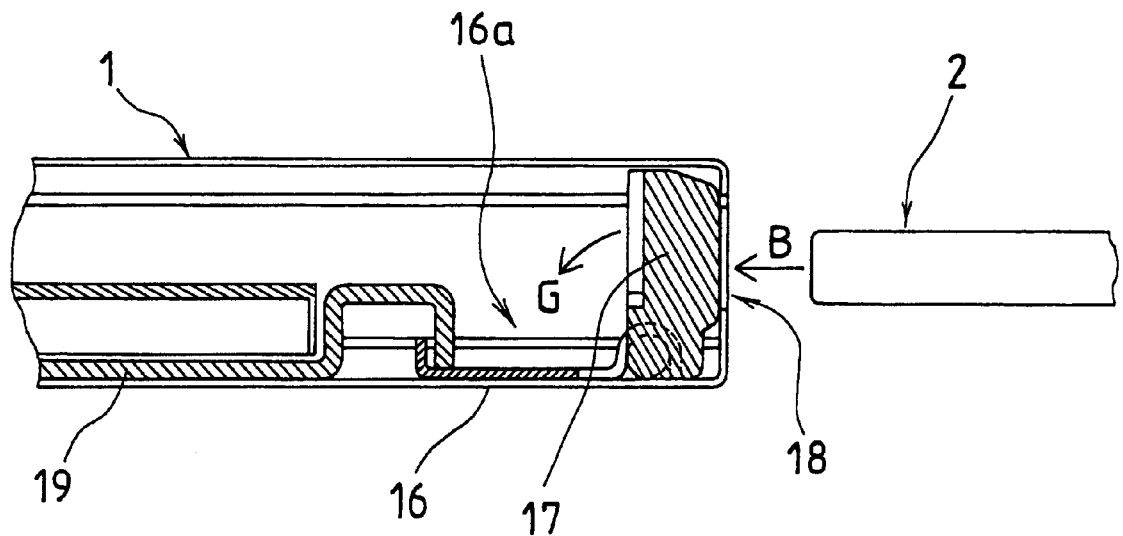
FIGS. 3 and 4 are views illustrating the action of a shutter which closes a cartridge insertion opening of the magnetic recording device of FIG. 1, respectively.
Figure 4:
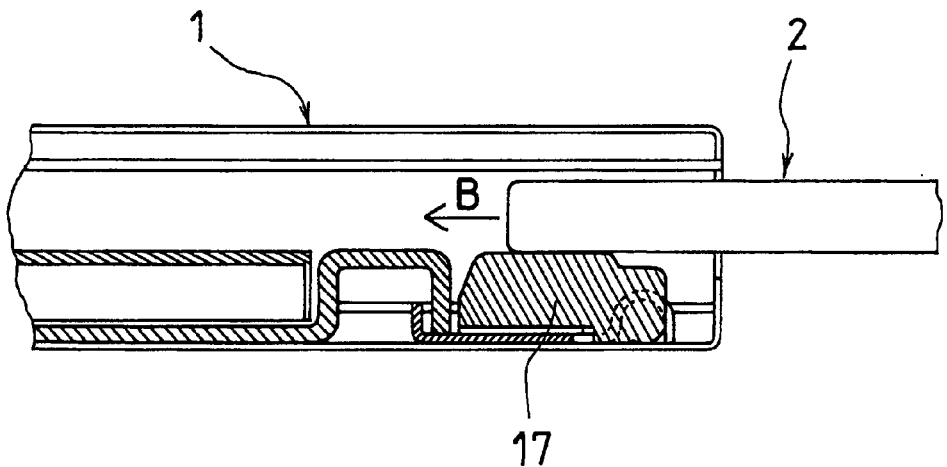

The shutter 17 is made to fall forward (in a direction shown by an arrow G in FIG. 3) by pushing the cartridge 2 in the case 4 through the cartridge insertion opening 18 in a direction shown by an arrow B in FIG. 3. With the above action, the cartridge 2 can be moved more forward in the direction shown by an arrow B in FIG. 4 after sliding on the top surface of the shutter 17 housed in a shutter housing 16a formed on the lower cover 16, as shown in FIG. 4. (Case deformation-proof member)

A description will now be given of an embodiment of a member installed in the case 4 to prevent the deformation of the case 4 of the magnetic recording device 1 even if an external force is applied to the case 4.

A member shown by a reference numeral 88 in FIG. 2 is equivalent to the first embodiment of a member (a case deformation-proof member) for preventing the deformation of the case 4. This case deformation-proof member 88 is mounted to the frame plate 19. A description will now be given of the case deformation-proof member 88 with reference to FIGS. 5 to 7.

Figure 5:
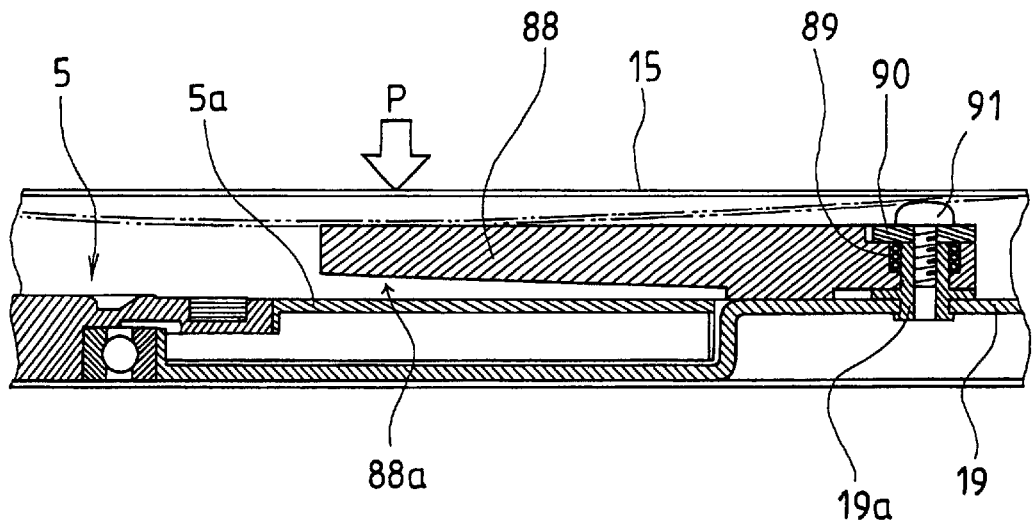
FIG. 5 is a view showing a section taken along line E—E of FIG. 1.

As shown in FIG. 5, a shaft 19a projects upward from the frame plate 19. The case deformation-proof member 88 is rotatably supported by the shaft 19a. A keep plate 90 and a screw 91 are provided to prevent the base end of the case deformation-proof member 88 from slipping out upward. The case deformation-proof member 88 is further energized by a coil spring 89 to make the pivotal motion in a direction opposite to a direction shown by an arrow D in FIG. 2.

When the cartridge 2 is absent in the magnetic recording device 1 as shown in FIG. 2, the case deformation-proof member 88 is rotationally moved by the energizing force of the coil spring 89 until the distal end of the case deformation-proof member reaches the substantial center of the case 4, that is, the position above the disk drive motor 5. In this connection, a recess portion 88a is formed on the bottom surface of the end of the case deformation-proof member 88 to prevent the disk drive motor 5 (i.e., its rotor 5a) from being pressed with the end of the deformation-proof member.

When a press force P is applied downward to the center portion of the upper cover 15, the upper cover 15 is bent downward. However, the upper cover 15 once bent downward is supported with the case deformation-proof member 88 serving as a cantilever after having made contact with the case deformation-proof member 88, thereby eliminating the possibility of more downward bend of the upper cover 15. That is, the force applied to the case deformation-proof member 88 is transmitted to the frame plate 19 through the shaft 19a, the keep plate 90 and the screw 91.

Thus, even if the press force P is applied to the center portion of the upper cover 15, the upper cover 15 is prevented from being largely deformed, thereby eliminating the possibility of the elastic deformation of the upper cover 15 and the damages to the disk drive motor 5.

A description will now be given of a mode of loading the cartridge 2 into the magnetic recording device 1 having the case 4 incorporating the case deformation-proof member 88 with reference to FIGS. 6 and 7.

Figure 6:
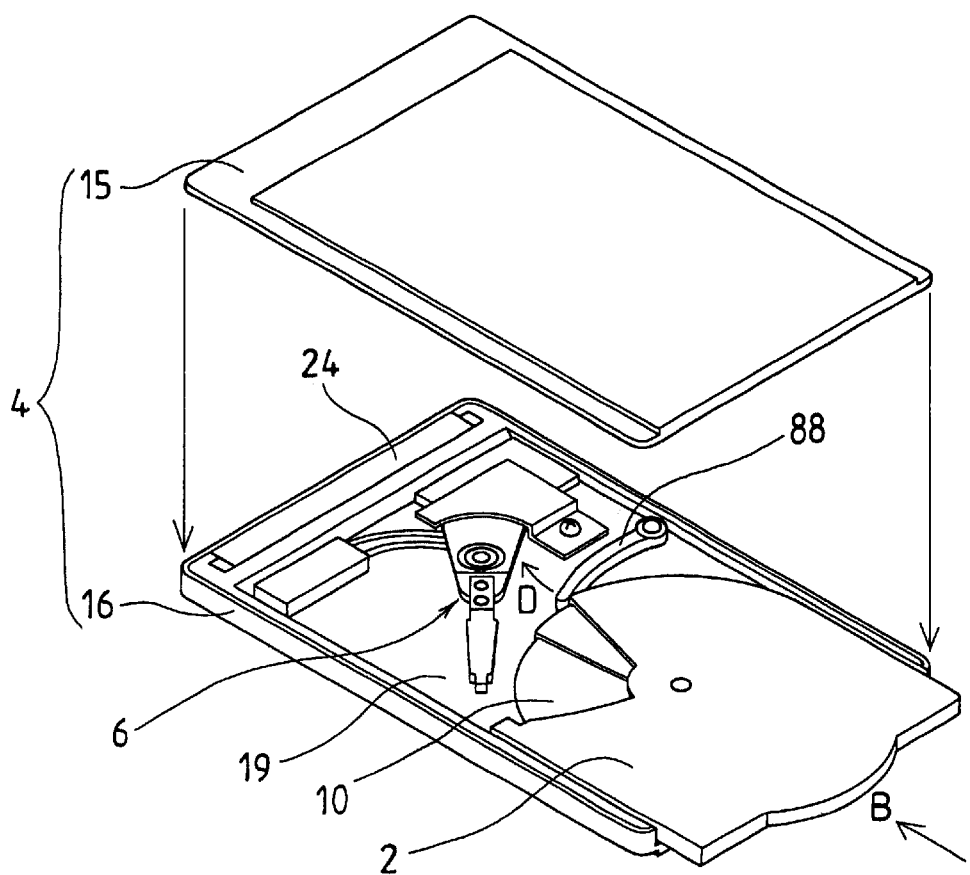
FIG. 6 is a view illustrating the state of the cartridge in the course of being inserted into the magnetic recording device of FIG. 2.

When the cartridge 2 is inserted into the magnetic recording device 1 (See FIG. 2) in the direction shown by an arrow B in FIG. 6, the case deformation-proof member 88 is pressed with the front end of the advancing cartridge 2 to start the pivotal motion against the energizing force of the coil spring 89 in the direction shown by an arrow D in FIG. 6.

Since the cartridge 2 shown in FIG. 6 is yet in the course of reaching the loading position in the magnetic recording device 1, there is a need to press the cartridge more in the direction shown by the arrow B. For the duration of the above action, the front end of the cartridge 2 continues to press the case deformation-proof member 88 for the pivotal motion. Finally, the cartridge 2 reaches the cartridge loading position in the case 4 as shown in FIG. 7.

Figure 7:
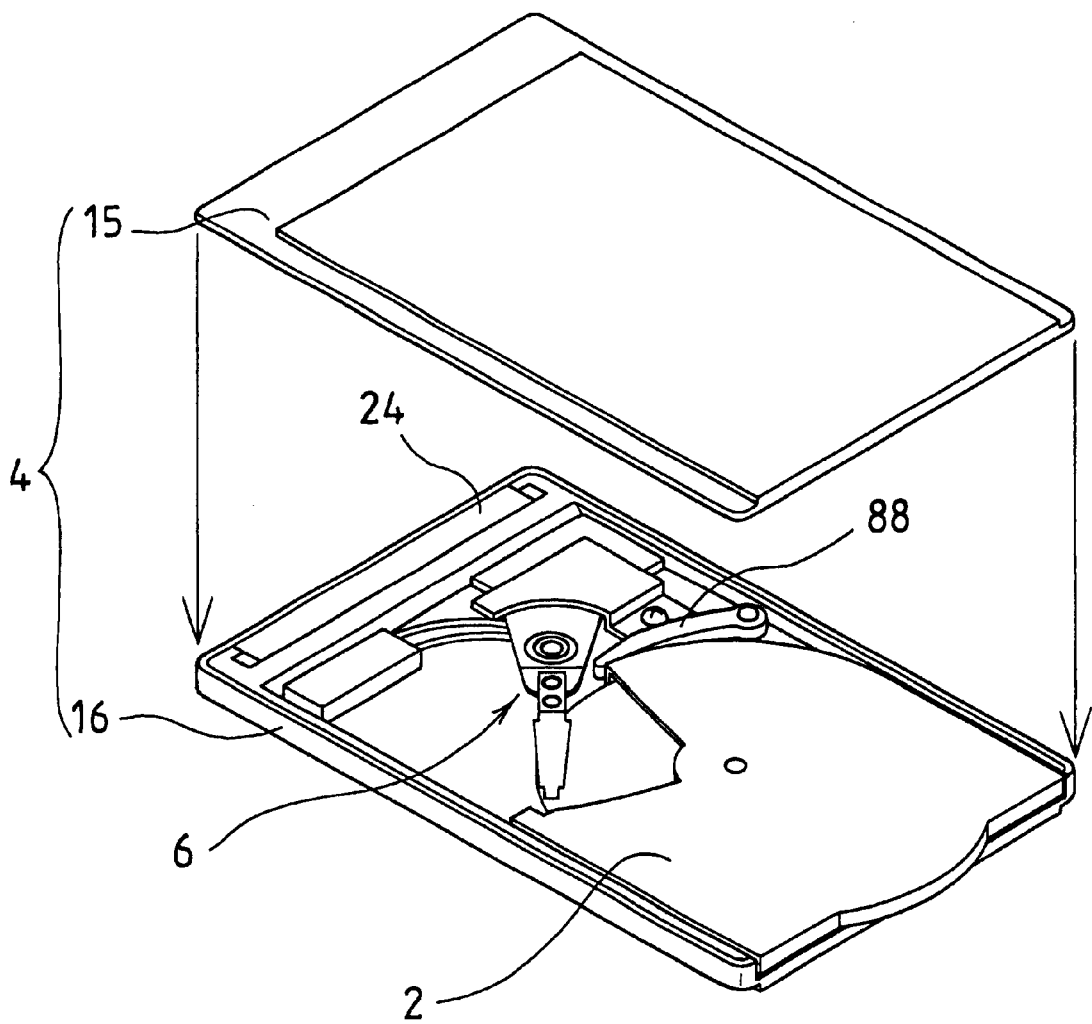
FIG. 7 is a view illustrating the state of the cartridge having been inserted into the magnetic recording device of FIG. 2 up to a loading position.
Figure 8:
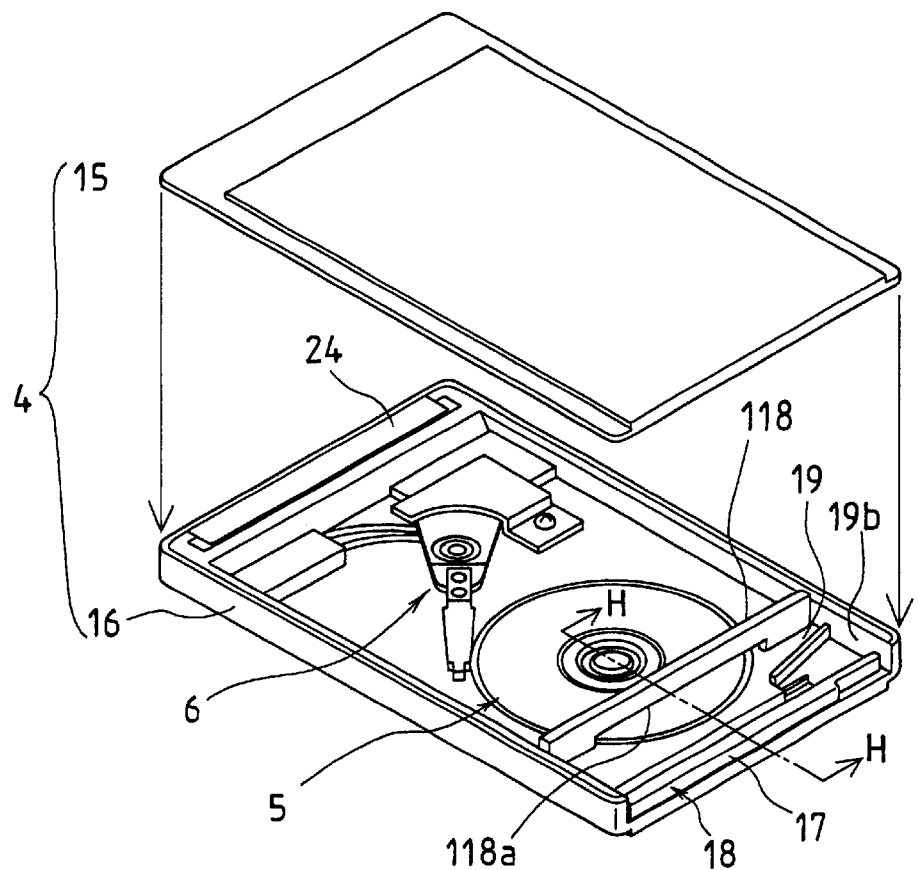
FIG. 8 is a view illustrating the magnetic recording device of FIG. 1, from which the upper cover is removed upward for the display of the inside components on condition that the second embodiment of a case deformation-proof member is incorporated in the magnetic recording device.

When the cartridge 2 is present in the magnetic recording device 1, the case deformation-proof member 88 is placed at a retreat position after having been rotationally moved at its maximum to the retreat position as shown in FIG. 7. The case deformation-proof member 88 placed as shown in FIG. 7 presses the end of the cartridge 2 toward the rear by the energizing force of the coil spring 89.

As described the above, the case deformation-proof member 88 prevents the deformation of the case 4 in the absence of the cartridge 2 (See FIG. 2). The case deformation-proof member 88 is drawn back to the retreat position (See FIG. 7) when the cartridge 2 is loaded into the case, whereas the deformation of the case 4 is prevented by the presence of the cartridge 2 in the case 4.

Thus, it is possible to surely prevent the deformation of the case 4 of the magnetic recording device 1, irrespectively of the presence or absence of the cartridge 2.

A description will now be given of the second embodiment of a case deformation-proof member with reference to FIGS. 8 to 11, in place of the first embodiment of the case deformation-proof member 88 shown in FIGS. 2 and 5 to 7.

A case deformation-proof member 118 is formed by a plate-shaped member of a length equal to the width (that is, a distance between left and right side walls 19b of the frame plate 19) of the case 4. A projection 118b (shown by a chain line in FIG. 9) extends from both left and right end faces of the case deformation-proof member 118 toward the opposite side walls 19b of the frame plate 19. The case deformation-proof member 118 can be pivoted about the projection 118b by the engagement of the projection 118b with a hole (not shown) formed in each of the opposite side walls of the frame plate 19.

Figure 9:
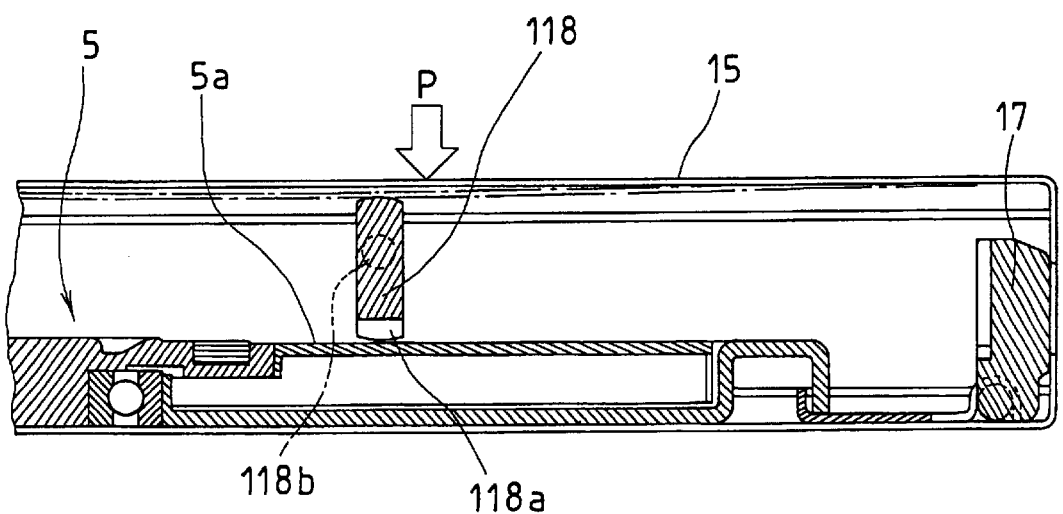
FIG. 9 is a view showing a section taken along line H—H of FIG. 8, provided that the upper cover is mounted to the magnetic recording device.

The case deformation-proof member 118 rotationally supported by the frame plate 19 is energized by a spring member (not shown) to make the rotational motion counterclockwise in FIG. 9, whereas the counterclockwise rotational motion of the case deformation-proof member is blocked with a stopper (not shown) to stop at a position (i.e., a rising position) in FIG. 9.

A recess portion 118a is formed on the bottom surface of the center portion of the case deformation-proof member 118 to prevent the case deformation-proof member 118 from making contact with the disk drive motor 5, even when the center portion of the case deformation-proof member 118 is bent downward by the application of the press force to the case 4.

As shown in FIG. 9, when the press force P is applied downward to the center portion of the upper cover 15, the upper cover 15 is bent downward by the press force P. However, the upper cover 15 is supported with the case deformation-proof member 118 after having made contact with the case deformation-proof member 118, thereby eliminating the possibility of more downward bend of the upper cover 15.

The press force P applied to the upper cover 15 is received with the frame plate 19 through the case deformation-proof member 118. Thus, even when the press force P is applied to the center portion of the upper cover 15, the upper cover 15 is prevented from being largely deformed, thereby eliminating the possibility of the plastic deformation of the upper cover 15 and the damages to the disk drive motor 5.

A description will now be given of a mode of loading the cartridge 2 into the magnetic recording device having the case 4 incorporating the case deformation-proof member 118 with reference to FIGS. 10 and 11.

Figure 10:
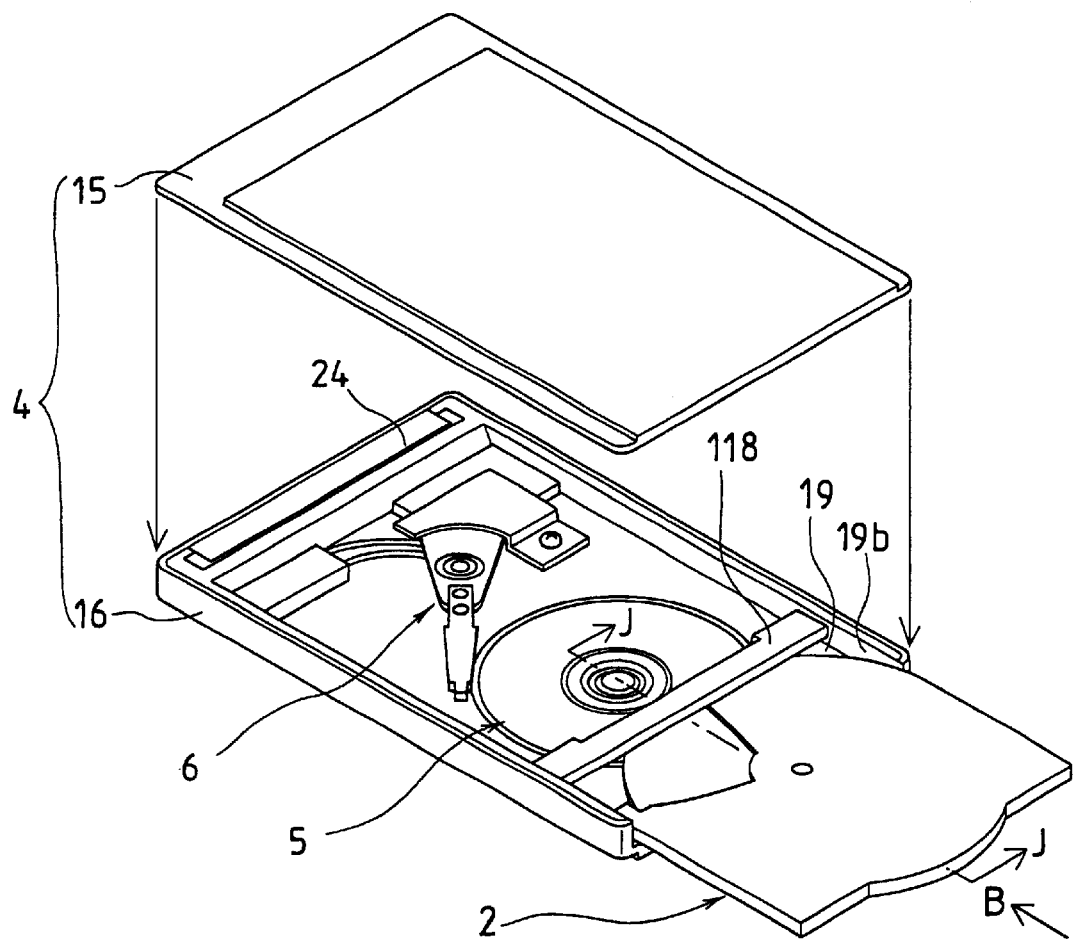
FIG. 10 is a view illustrating the state of the cartridge in the course of being inserted into the magnetic recording device of FIG. 9.

When the cartridge 2 is moved in the direction shown by an arrow B in FIG. 10 for the insertion into the magnetic recording device 1 (See FIG. 8), the end of the cartridge 2 makes contact with the case deformation-proof member 118. When the cartridge 2 is pushed more in the magnetic recording device, the case deformation-proof member 118 is changed from the rising state (See FIG. 9) to the fallen-down state (See FIGS. 10 and 11) by the clockwise rotational motion against the energizing force of the spring member (not shown) to make retreat to the outside of a cartridge insertion area.

The magnetic recording device 1 equipped with the case deformation-proof member 118 according to the second embodiment becomes larger in thickness than the magnetic recording device 1 equipped with the case deformation-proof member 88 according to the first embodiment. However, since the opposite ends of the case deformation-proof member 118 in the second embodiment are supported with the frame plate 19, the case deformation-proof member 118 can withstand a larger force, in comparison with the case deformation-proof member 88 according to the first embodiment where only one end is supported with the frame plate 19 and the other end is made free (that is, in the shape of a cantilever).

Figure 11:
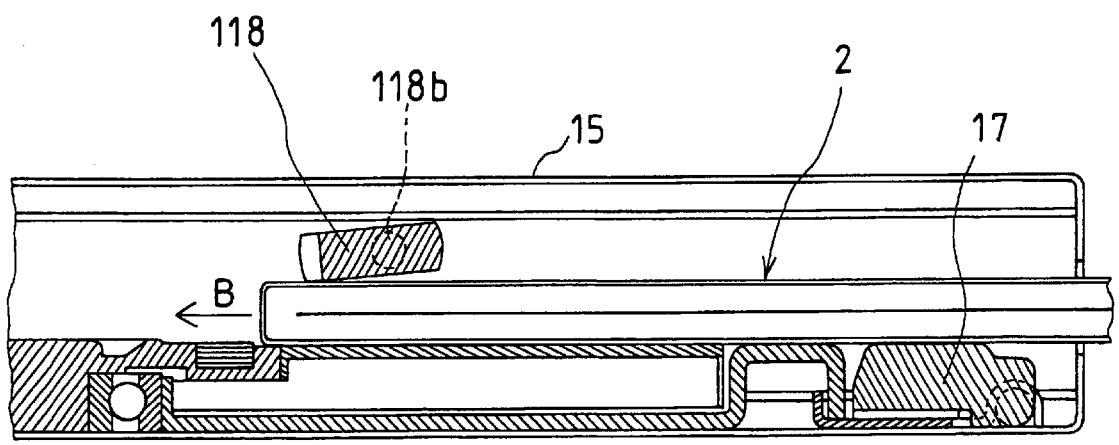
FIG. 11 is a view showing a section taken along line J—J of FIG. 10, provided that the upper cover is mounted to the magnetic recording device.

After the cartridge 2 placed as shown in FIG. 11 has been pushed more in the direction shown by the arrow B in FIG. 11 up to the loading position, the case deformation-proof member 118 is held in the state of having made retreat to the outside of the cartridge insertion area by the cartridge 2.

As described above, in the magnetic recording device 1 equipped with the case deformation-proof member 88 or 118 according to the first or second embodiment, the external force P applied to the case 4 (the upper cover 15) is stopped the case deformation-proof member 88 or 118 provided between the upper cover 15 and the frame plate 19 when the case 4 is liable to be deformed because the cartridge 2 is absent therein. When the cartridge 2 is present in the magnetic recording device 1, on the other hand, the case deformation-proof member is in retreat position outside the cartridge passing area.

A description will now be given of the magnetic recording device 1 having the frame plate 19 mounted with a cartridge eject mechanism, in addition to the disk drive motor 5 and the write/read head body 6, with reference to FIGS. 12 to 19. One of components of the cartridge eject mechanism has a function of preventing the deformation of the case.

Figure 12:
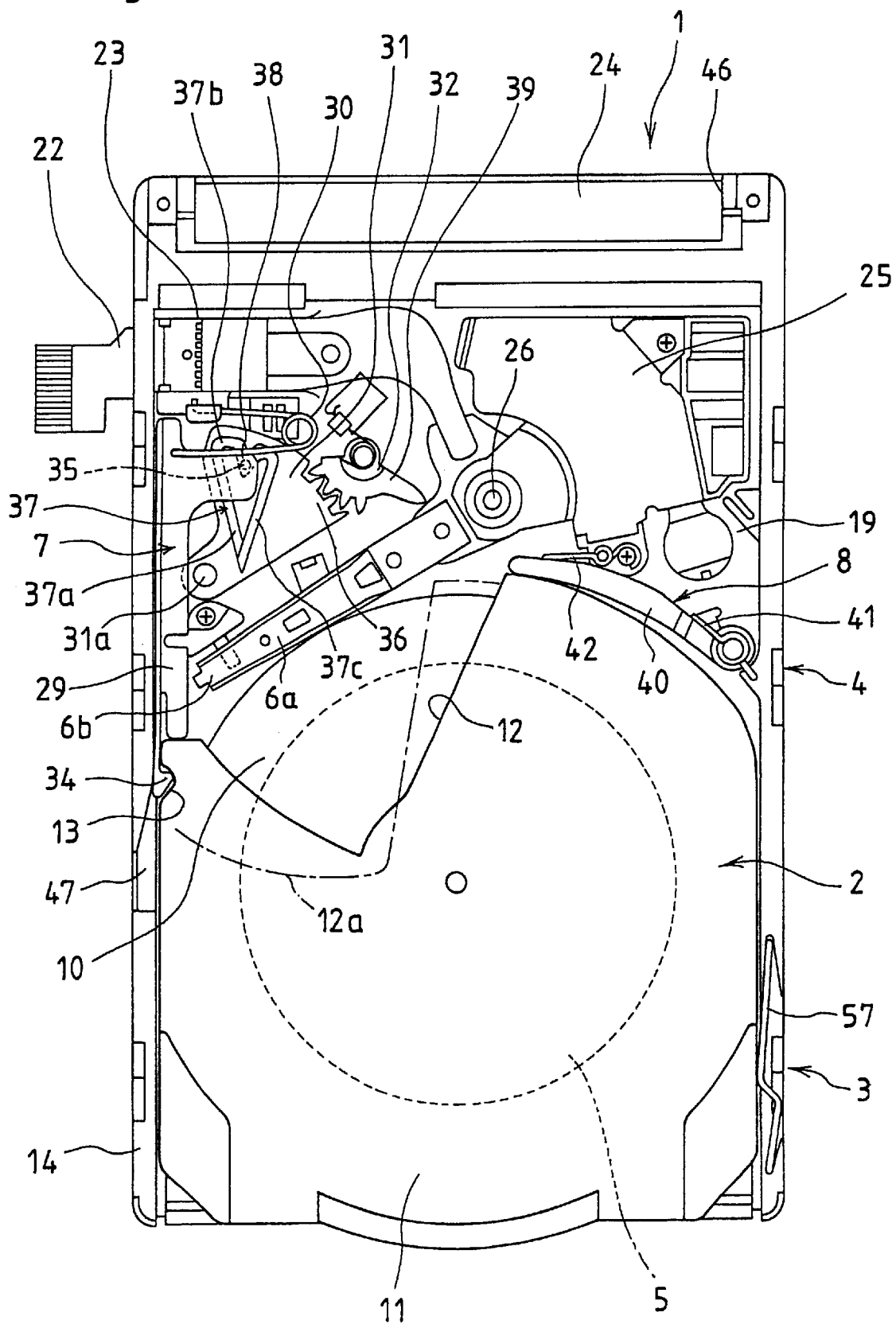
FIGS. 12 and 13 are views showing another embodiment of the magnetic recording device according to the present invention, from which the upper cover is removed for the display of the inside components, provided that the cartridge is inserted into the magnetic recording device of FIG. 12 up to a loading position, and that the cartridge is ejected from the magnetic recording device of FIG. 13.
Figure 13:
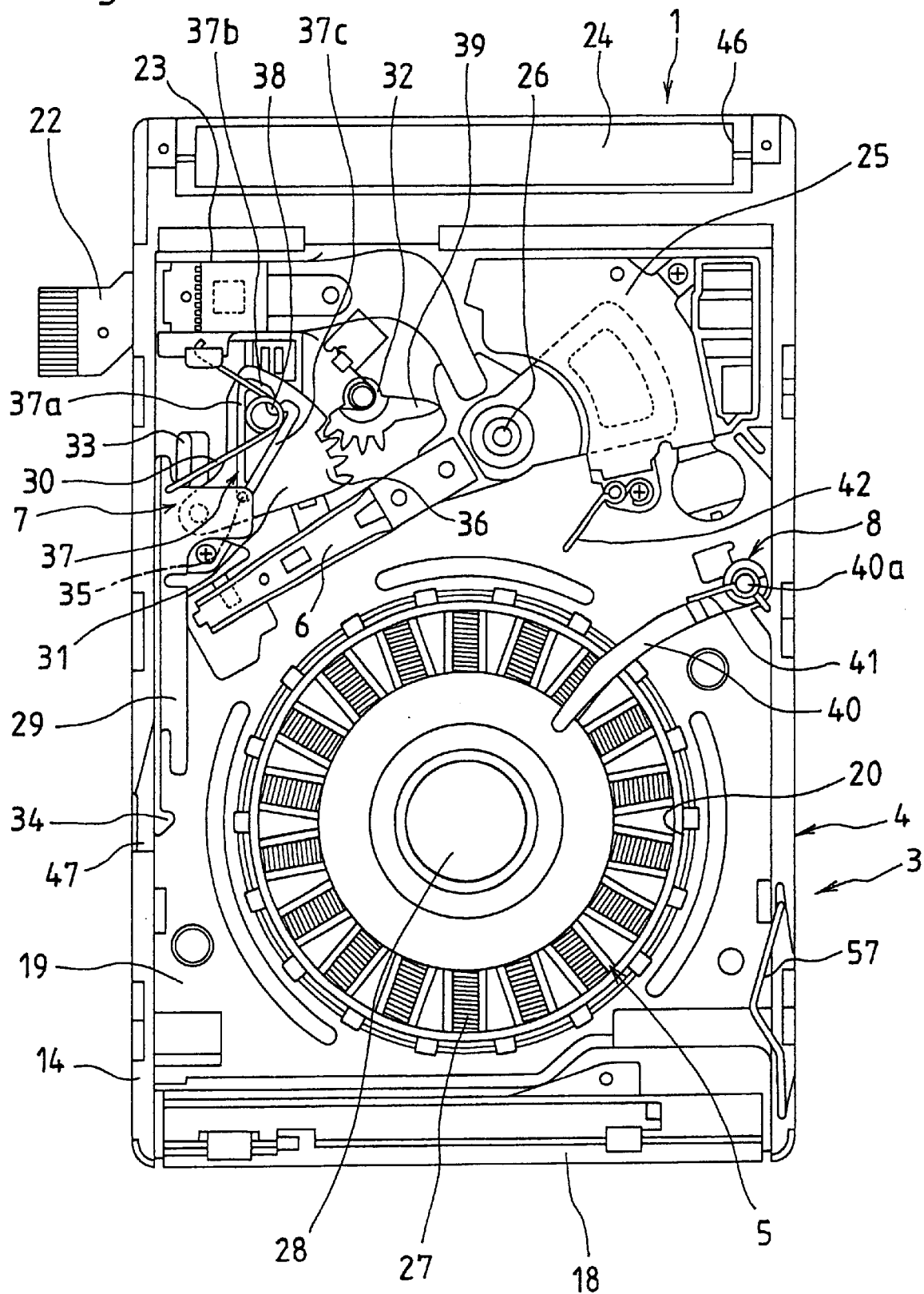
Figure 14:
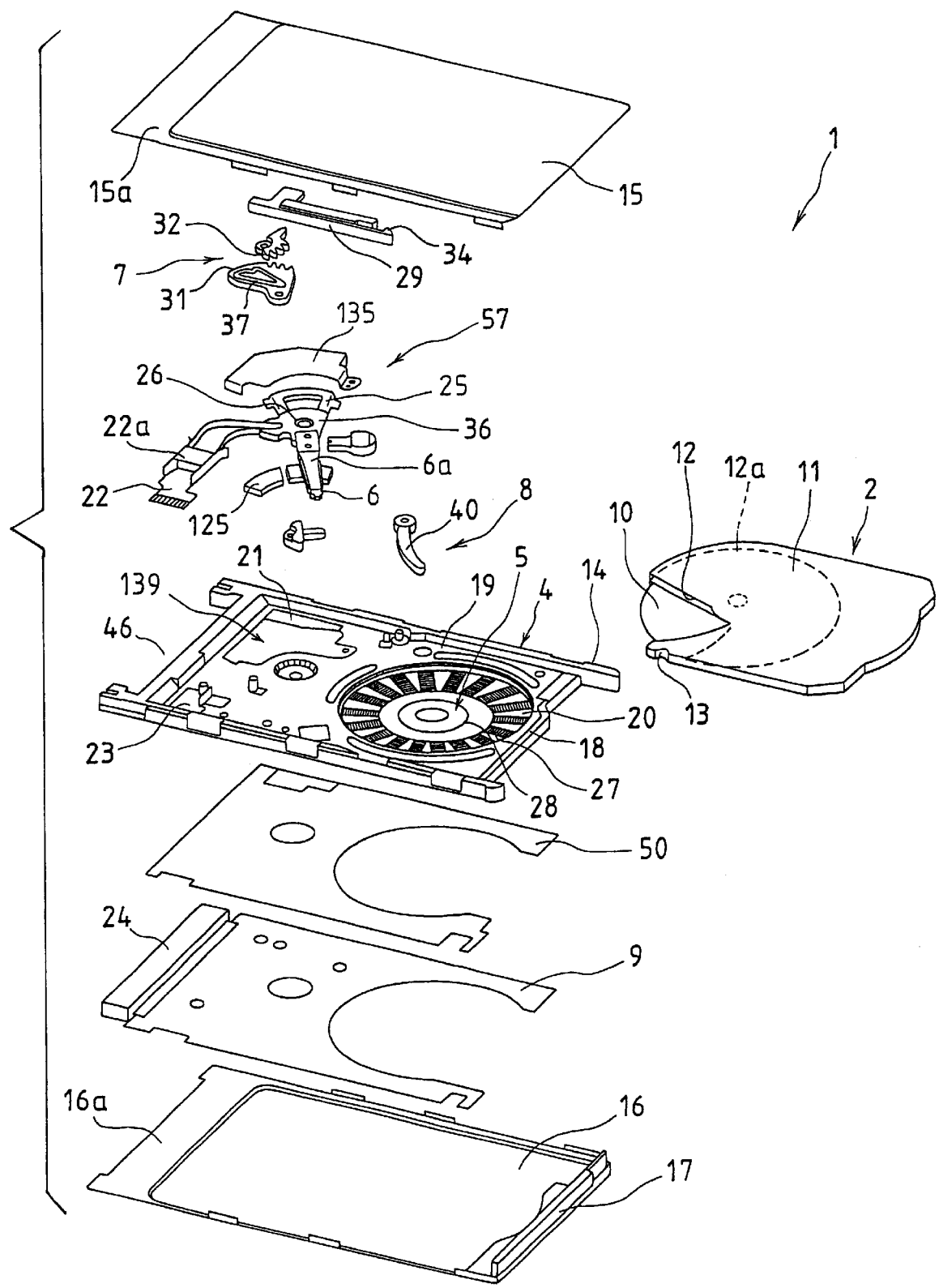
FIG. 14 is an exploded perspective view showing the magnetic recording device of FIGS. 12 and 13.

As shown in FIGS. 12 to 14, the case 4 of the magnetic recording device 1 incorporates main and sub eject mechanisms 7, 8 for ejecting the cartridge 2 and a circuit substrate 9 for performing electric control, in addition to the disk drive motor 5 for driving the cartridge 2 and the write/read head body 6 having the head 6b for writing and reading information on and from the recording medium.

On the other hand, an opening 12 is formed in the front of the shell 11 of the cartridge 2 as shown in FIG. 14. The opening 12 is opened or closed by a shutter 12a. When the cartridge 2 is inserted into the case 4, the shutter 12a is opened by the insertion of the cartridge to expose the disk 10 to the outside. A mechanism of opening the shutter 12a will be described later with reference to FIG. 21. Whenever the cartridge 2 is set at the loading position in the case 4, the write/read head body 6 is placed opposite to the disk 10 exposed to the outside.

A concave portion 13 making engagement with the main eject mechanism 7 is formed at one side end face of the shell 11 of the cartridge 2.

The case 4 is composed of an upper cover 15 made of metal, a lower cover 16 made of metal and a side frame 14 made of a material consisting of polycarbonate resin containing glass filler for reinforcement, as shown in FIG. 14. A clearance 46 to which the connector 24 is fitted is formed at the front end of the side frame 14. Lower step portions 15a, 16a for making connection with the side frame 14 are respectively formed on the peripheral edges of the upper cover 15 and the lower cover 16 other than the rear ends thereof.

The insertion opening 18 for allowing the insertion or drawing-out of the cartridge 2 into or from the case 4 is formed in the rear end of the case 4. The shutter 17 is provided on the lower cover 16 at a portion facing the insertion opening 18 such that the shutter may be put in a rising posture or a fallen-down posture freely. When the cartridge 2 is absent in the case 4, the shutter 17 is placed in a closed state at all times.

The frame plate 19 united with the side frame 14 is located in a rectangular area enclosed by the side frame 14. The frame plate 19 is made of stainless steel and is united with the side frame 14 by molding (outsert molding). The frame plate 19 is mounted with the disk drive motor 5, the write/read head 6, the main eject mechanism 7 and the sub eject mechanism 8.

Figure 15:
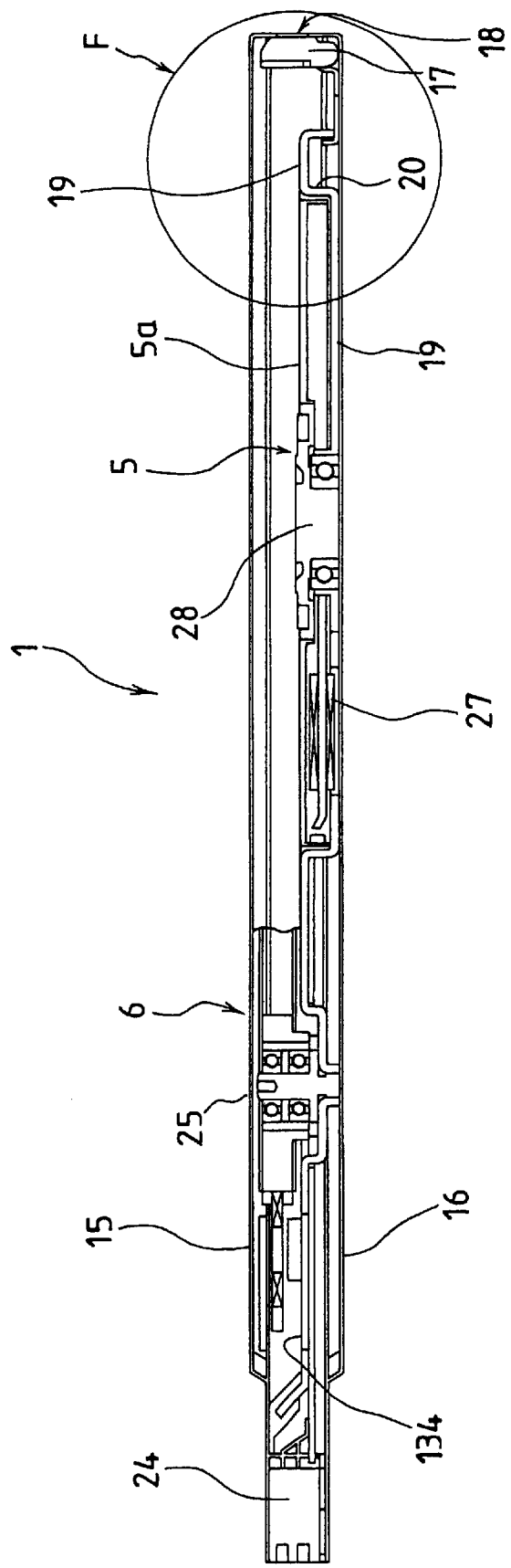
FIG. 15 is a view showing a section taken along line C—C of FIG. 2 and also showing a longitudinal section of FIG. 13, provided that the upper cover is mounted to the magnetic recording device, and an enclosed portion indicated by F in FIG. 15 is shown in FIG. 3 on an enlarged scale.

As shown in FIG. 15 corresponding to the section taken along line C—C in FIG. 2, the disk drive motor 5 is mounted to the frame plate 19 in a manner such that it is fitted into a circular depression 20 formed in the rear of the frame plate 19. The disk drive motor 5 comprises a rotor 28 and a stator 27.

The rotor 28 has a mechanism (not shown) for positioning and fixing the disk 10 in the cartridge 2. This positioning and fixing mechanism attracts a hub (not shown) projecting from the center portion of the disk 10. The hub of the disk 10 is exposed to the outside through a hole formed in one face of the shell 11 of the cartridge 2.

Figure 16:
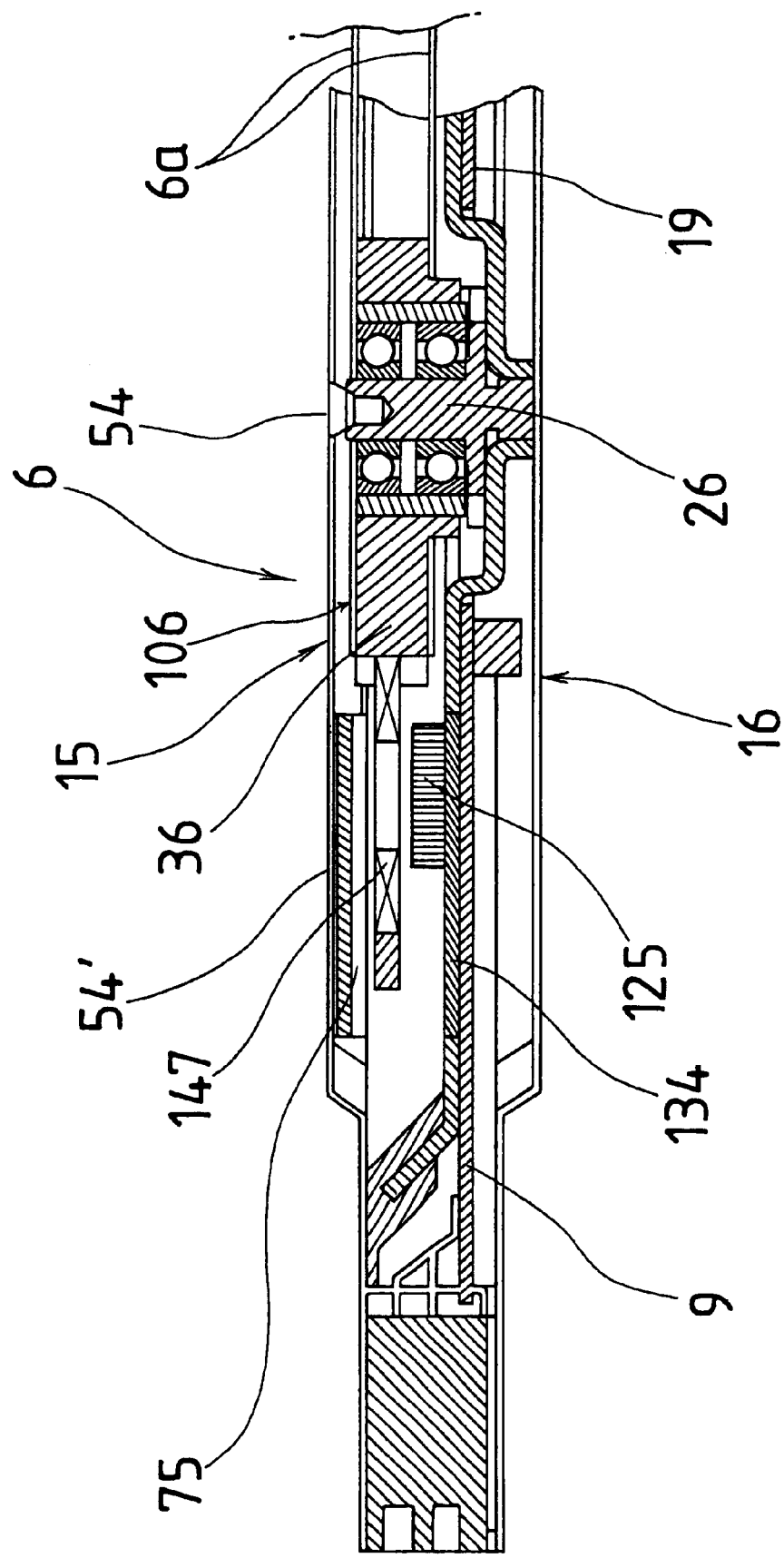
FIG. 16 is a sectional view illustrating a drive mechanism of a write/read head in the magnetic recording device of FIGS. 2 and 13.

As shown in FIG. 16, the write/read head body 6 comprises a head body 106 which can rotate through a bearing about a head axis 26 fixed to the frame plate 19 and an arm 6a having one end fixed to the head body 106. The end of the arm 6a has a head 6b (See FIG. 12) for writing and reading information on and from the disk 10. The head body 106 is further mounted with a head moving coil 147. The head moving coil 147 is inserted into a magnetic field formed by an upper yoke 135 (See FIG. 14) and a lower yoke 134 up to a position opposite to a head drive magnet 125. Incidentally, the lower yoke 134 is fitted into a through hole 21 (See FIG. 14) formed in a front portion of the frame plate 19.

The head moving coil 147 is connected to a control circuit of the circuit substrate 9 through FPCs (flexible printed circuits) 22, 22a (See FIG. 14).

A through hole 23 for allowing the insertion of each FPC is further formed in the front portion of the frame plate 19.

As shown in FIG. 14, the circuit substrate 9 is arranged on the bottom side of the frame plate 19 through an insulating sheet 50. The circuit substrate 9 is connected to a drive mechanism 25 of the write/read head body 6 through the FPC 22 and is further electrically connected to the disk drive motor 5. The connector 24 meeting PCMCIA standard requirement is connected to the front end of the circuit substrate 9. The connector 24 is fitted into the clearance 46 at the front end of the side frame 14 to be exposed to the outside of the case 4.

As shown in FIGS. 12 and 13, the main eject mechanism 7 comprises a slide arm 29 making a longitudinal slide motion along one side of the case 4, a torsion coil spring 30 for energizing the slide arm 29 toward the rear, a sectorial guide piece 31 rotatably mounted on the frame plate 19 and a semicircular gear 32 having teeth meshing with teeth 36 formed at a part of the peripheral edge of the guide piece 31.

The slide arm 29 makes a longitudinal slide motion between the side frame 14 and a guide wall 33 provided on the inside of the side frame. A projection 34 making engagement with the concave portion 13 of the cartridge 2 is formed at the rear end of the slide arm 29. When the slide arm 29 is placed as shown in FIG. 12, the projection 34 of the slide arm 29 is in engagement with the concave portion 13 of the cartridge 2.

An overhang portion extends from the front end of the longitudinally elongated slide arm 29 toward the inside of the case 4. A pin-shaped slide projection 35 projects from the bottom surface of the overhang portion. Incidentally, the slide projection 35 is placed on the reverse side of the overhang portion, and therefore, is shown by a dotted circle in FIGS. 12 and 13.

The guide piece 31 is rotatably mounted to a shaft 31a fixed to the frame plate 19. The top surface of the guide piece 31 has a guide groove 37 of a predetermined width as a circulation path making a round in the shape of a substantially isosceles triangle. The guide groove 37 shown in FIGS. 12 and 13 is composed of three sides, that is, a first side 37a, a second side 37b and a third side 37c. A rearward projecting concave portion 38 for engagement is formed at an intermediate portion of the second side 37b in a manner such that it communicates with the second side 37b.

The slide projection 35 of the slide arm 29 makes a round along the isosceles triangular guide groove 37 counterclockwise (that is, in order of the sides 37c, 37b and 37a) in engagement with this isosceles triangular guide groove 37 as will be described later. Incidentally, in the vicinity of a point of intersection between the first and third sides 37a and 37c of the guide groove 37, third side 37c is grooved deeper than the first side 37a.

When the cartridge 2 is absent in the case 4 as shown in FIG. 13, the slide projection 35 of the slide arm 29 is placed within the third side 37c of the guide groove 37 at a position close to the first side 37a.

The gear 32 is energized by a spring (not shown) for counterclockwise rotation. As a result, the guide piece 31 having the teeth 36 meshing with the gear 32 is energized for clockwise rotation. When the cartridge 2 is absent in the case 4 as shown in FIG. 13, the guide piece 31 is rotated clockwise with the rotation of the gear 32 energized by the spring, and as a result, the first side 37a of the guide groove 37 is directed longitudinally (that is, in parallel to the side frame 14).

A press piece 39 is fromed on the gear 32 as one body in a manner such that it extends to go away from the guide piece 31. The end of the press piece 39 is always in contact with the base portion of the arm 6a mounted with the write/read head body 6 at the end. As a result, since the gear 32 is energized by the spring for counterclockwise rotation as described above, the press piece 39 exerts a press force on the arm 6a such that the write/read head body 6 may become more distant from the disk drive motor 5.

The sub eject mechanism 8 comprises a lever member 40, which is pressed against the cartridge and moves when the cartridge 2 is inserted, and a leaf spring member 42.

The lever member 40 is rotatably supported by a shaft 40a projecting from the frame plate 19. The lever member 40 is energized by the spring 41 such that the end of the lever member 40 may be pivoted toward the cartridge insertion opening 18. Thus, when the cartridge 2 is not loaded in the case 4 as shown in FIG. 13, the end of the lever member 40 is placed on a top surface area of the rotor 28 of the disk drive motor 5.

Then, when the cartridge 2 is inserted into the case 4 through the insertion opening 18 at the rear end of the case, the lever member 40 is caused to be pivoted clockwise against the energizing force of the spring 41 with the front end of the forwardly-moving cartridge 2 so that the end of the lever member 40 moves forward. Simultaneously with the movement of the lever member 40, the shutter 12a having closed the opening 12 of the cartridge 2 is gradually opened (its mechanism will be described later) so that the disk 10 is exposed to the outside.

With the more forward movement of the cartridge 2, the lever member 40 makes contact with the leaf spring member 42 to bend the leaf spring member 42 forward. As a matter of course, the leaf spring member 42 exerts a rearward press force on the cartridge 2 additionally.

On the other hand, with the forward movement of the cartridge 2 by a certain distance, the side end of the cartridge 2 makes contact with the projection 34 of the slide arm 29. With the more forward movement of the cartridge 2, the rear end of the slide arm 29 is bent toward the outside of the case 4 so as to make retreat into a notch 47 formed in the side frame 14. With the more forward movement of the cartridge 2 from the above state, the concave portion 13 of the cartridge 2 reaches a portion opposite to the projection 34 of the slide arm 29.

With the above action, the projection 34 of the slide arm 29 is fitted into the concave portion 13 of the cartridge 2 to restore the slide arm 29 to its original position (i.e., a posture parallel to the side frame 14).

Then, with the still more forward movement of the cartridge 2, the slide arm 29 slides forward together with the cartridge 2. With the forward slide motion of the slide arm 29, the slide projection 35 engaged with the guide groove 37 of the guide piece 31 also starts sliding from the position in FIG. 13 (that is, a portion of the first side 37a crossing the third side 37c) forward. However, since the third side 37c is grooved deeper than the first side 37a as described above, the slide projection 35 moves forward along the third side 37c without running on to the first side 37a even when pressed forward.

With the above action, the guide piece 31 is rotated counterclockwise about the shaft 31a in process of a forward movement of the slide projection 35 of the slide arm 29 along the third side 37c. As a result, the gear 32 meshing with the guide piece 31 is rotated clockwise.

With the more forward movement of the cartridge 2 together with the slide arm 29, the slide projection 35 of the slide arm 29 reaches the point of intersection of the third side 37c with the second side 37b. At this point of time, the force which causes the guide piece 31 to rorate further counterclockwise disappears. As a result, since a force for clockwise rotation is exerted on the guide piece 31 by the force of rotation of the gear 32 energized counterclockwise by the spring, the slide projection 35 moves along the second side 37b.

On the other hand, when the slide projection 35 reaches the portion where the concave portion 38 is formed in course of movement along the second side 37b, the slide projection 35 falls into the concave portion 38 for engagement since the slide arm 29 is energized rearward by the torsion coil spring 30. As a result, the slide projection 35, that is, the slide arm 29, is stopped as shown in FIG. 12. Then, the cartridge 2 is placed in the state of being set at the loading position in the case 4.

On this occasion, the hub of the disk 10 is attracted and fixed in place by the positioning and fixing mechanism provided in the rotor 28 of the disk drive motor 5.

When the cartridge 2 is set at the loading position of the case 4, the sub eject mechanism 8 exerts a press force on the cartridge 2 to move the cartridge rearward, that is, toward the cartridge insertion opening 18. However, this force is not sufficient to release the cartridge 2 from its set state.

For ejecting the cartridge 2 from the case 4, a step of pushing the rear end, which projects from the case 4 to the outside, of the cartridge 2 slightly forward is needed firstly.

Then, the slide arm 29 is moved forward together with the cartridge 2 until the slide projection 35 of the slide arm 29 gets away from the concave portion 38 for engagement of the guide piece 31. Then, the guide piece 31 is rotated clockwise by the energizing force of the gear 32. As a result, the rotation of the guide piece 31 allows the slide projection 35 to be moved along the guide groove 37 toward the point of intersection of the first side 37a with the second side 37b.

When the slide projection 35 reaches the point of intersection of the first side 37a with the second side 37b of the guide groove 37, the first side 37a is placed in parallel to the side frame 14 of the case 4. On the other hand, since the slide arm 29 is always energized rearward by the torsion coil spring 30, the slide projection 35 of the slide arm 29 is moved rearward along the first side 37a of the guide groove 37.

Since the projection 34 at the rear end of the slide arm 29 is fitted into the concave portion 13 of the cartridge 2, on the other hand, the cartridge 2 is pressed rearward in association with a rearward movement of the slide projection 35 along the first side 37a of the guide groove 37.

More specifically, in the first half stage of the process where the cartridge 2 is moved by being pressed rearward, a force is applied to one side of the cartridge 2 by the main eject mechanism 7 (the torsion coil spring 30), and also a force is applied to the other side of the cartridge by the sub eject mechanism 8 (the spring 41) and the spring 42. Further, the disk 10 and the rotor 28 are released from fixation by the movement of the cartridge 2 in this stage.

In the second half stage of the process where the cartridge 2 is moved by being pressed rearward, a force is applied to one side of the cartridge 2 by the main eject mechanism 7, and also a force is applied to the other side of the cartridge 2 by the sub eject mechanism 8. Since the force of the spring 42 does not have any effect on the cartridge 2 in this stage, the force to push out the cartridge 2 rearward is reduced accordingly.

When the cartridge 2 is drawn out of the case 4, the lever member 40 holds the posture where the end thereof lies in vicinity of the area just above the top surface of the rotor 28 of the disk drive motor 5 as shown in FIG. 13.

When the lever member 40 is placed in the above posture, the bottom surface of the base end portion makes contact with the top surface of the frame plate 19, while the bottom surface of the distal end portion is slightly separated from the top surface of the rotor 28. Consequently, when the upper cover 15 of the case 4 is pressed downward, the lever member 40 serving as a cantilever receives such a press force, so that deformation of the case 4 can be prevented. When a larger force is further applied to the upper cover 15 of the case 4, the distal end portion of the lever member 40 is bent until the bottom surface of the end makes contact with the top surface of the rotor 28. Thus, there is no fear that the upper cover 15 is depressed down beyond a certain depth though the external force is applied to the upper cover 15.

Figure 17:
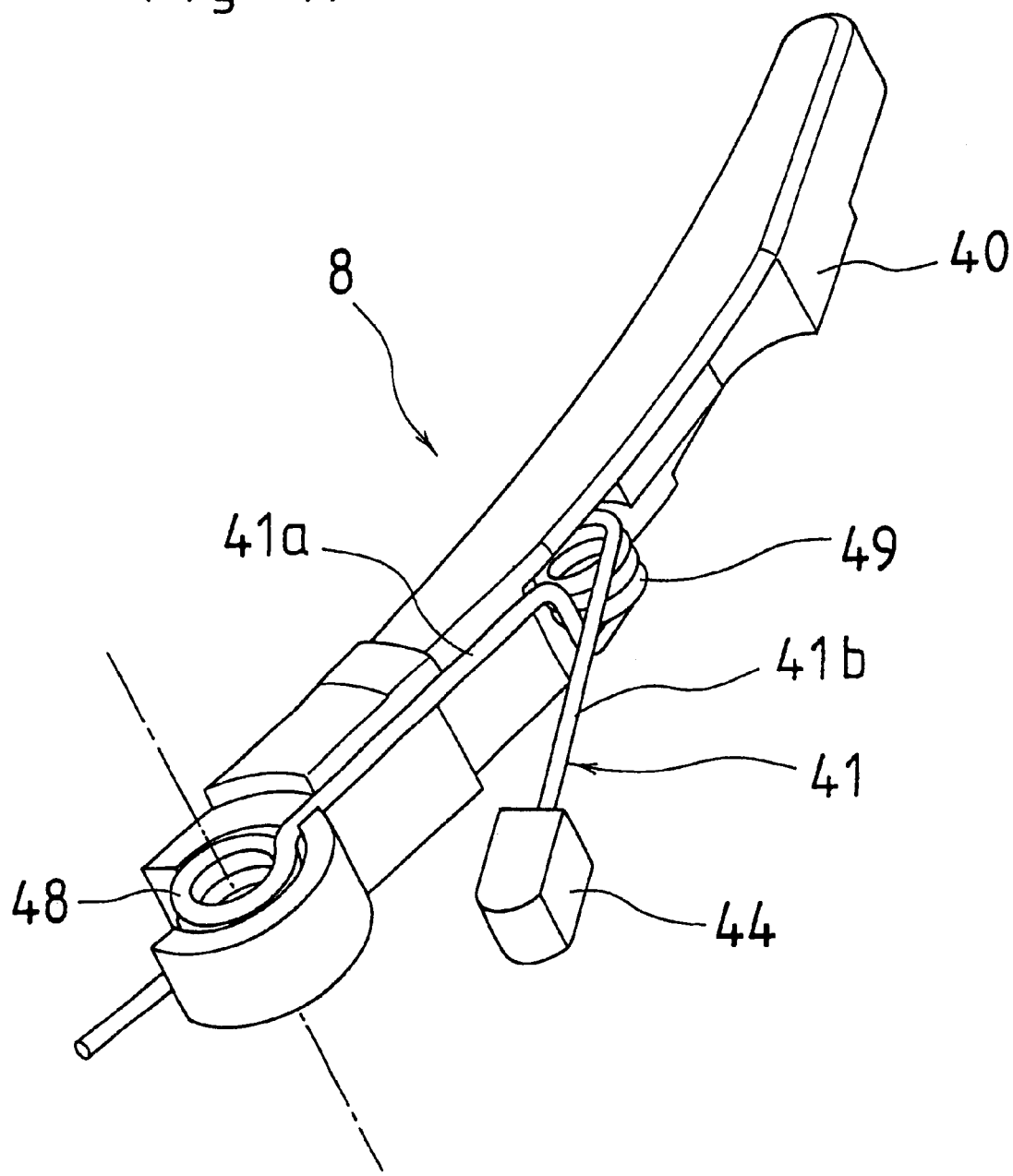
FIG. 17 is a view illustrating a lever member different in mode from a lever member constituting a sub eject mechanism shown in FIG. 13.
Figure 18:
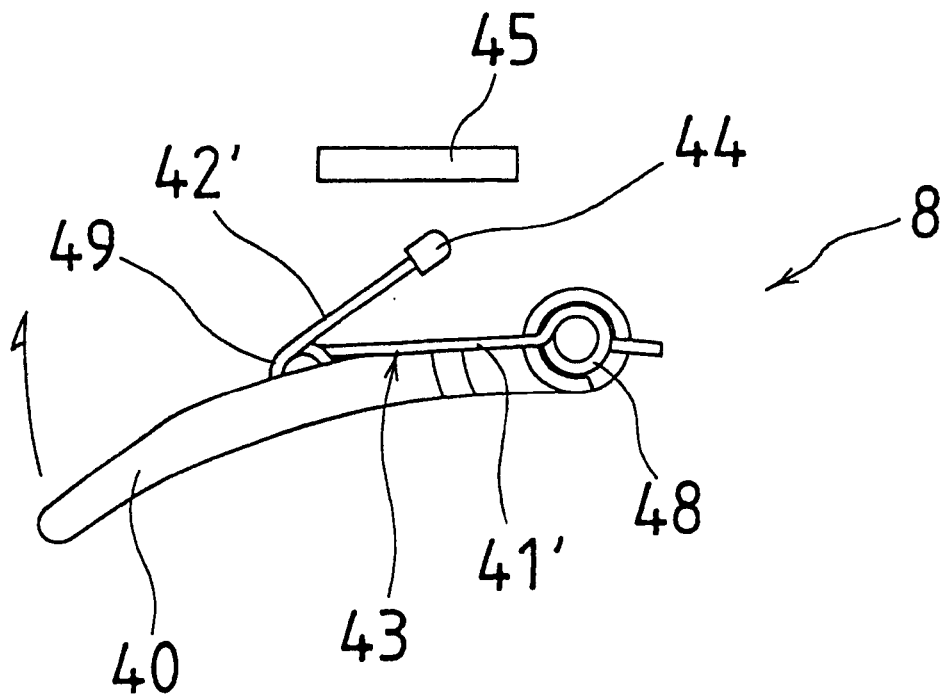
FIG. 18 is a view illustrating the action of the lever member of FIG., 17 and that of a spring member for energizing the lever member in the state of the cartridge in the course of being inserted into the magnetic recording device.
Figure 19:
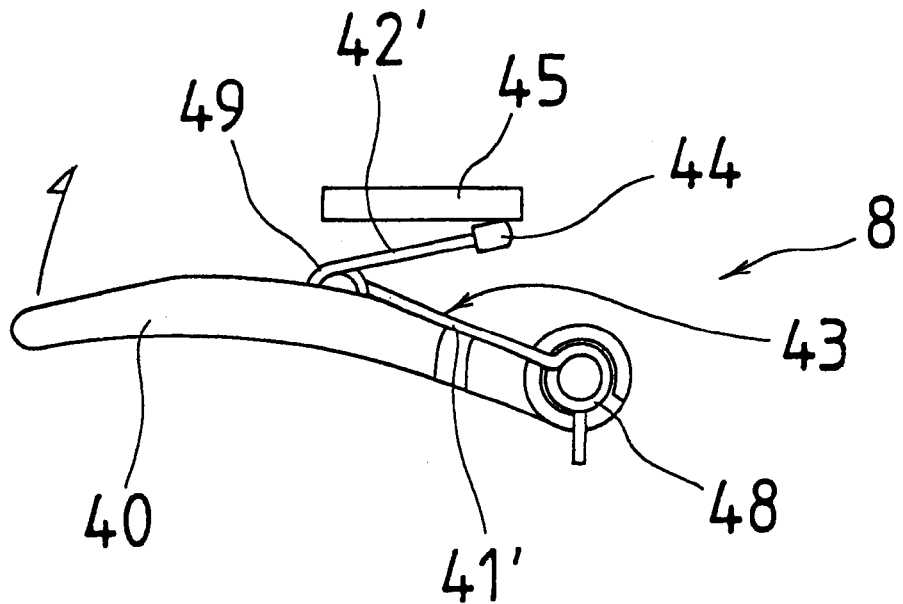
FIG. 19 is a view illustrating the action of the lever member of FIG. 17 and that of a spring member for energizing the lever member in the state of the cartridge having been inserted into the magnetic recording device up to a loading position.

A description will now be given of another embodiment of the sub eject mechanism with reference to FIGS.17 to 19, in place of the sub eject mechanism 8 shown in FIGS. 12 and 13.

The spring 41, which energizes the lever member 40 to rotate so that the end of the lever member 40 moves toward the cartridge insertion opening 18, comprises a first spring portion 41a having a first coil portion 48 and a second spring portion 41b having a second coil portion 49, and the first spring portion and the second spring portion are connected together as one body through the second coil portion 49.

The first coil portion 48 of the first spring portion 41a is fixed to the lever member 40 at its pivotal center axis. A plastic cap 44 is mounted to the end of the second spring member 41b. On the other hand, the frame plate 19 has a rising wall 45 which is placed opposite to the plastic cap 44.

When the cartridge 2 is inserted into the case 4, the lever member 40 is pressed forward with the shell 11 of the cartridge 2. When the cartridge 2 starts moving forward, the first spring portion 41a rotates together with the lever member 40 so that it starts bending. With the more forward movement of the cartridge 2, the plastic cap 44 at the end of the second spring portion 41b makes contact with the rising wall 45 provided on the frame plate 19. With the still more forward movement of the cartridge 2, the movement of the plastic cap 44 of the second spring portion 41b is blocked by the rising wall 45, and as a result, the second spring portion 41b also starts bending.

Thus, when the cartridge 2 is set at the loading position in the case 4, the cartridge 2 is energized rearward by both the first spring portion 41a and the second spring portion 41b. Then, when the cartridge 2 is drawn out of the case 4, the energizing force of both the first spring portion 41a and the second spring portion 41b are exerted on the cartridge at first. However, with the rearward movement of the cartridge 2 by a certain distance, the plastic cap 44 at the end of the second spring portion 41b is separated from the rising wall 45 of the frame plate 19, and thereafter, the energizing force of only the first spring portion 41a is applied to the cartridge 2 which is moving rearward.

Incidentally, the first spring portion 41a may be formed separately from the second spring portion 41b. Also, the rising wall 45 may be formed as one body with the cover for covering the drive mechanism 25 of the write/read head body 6, instead of being fixed to the frame plate 19 directly.

Figure 20A:
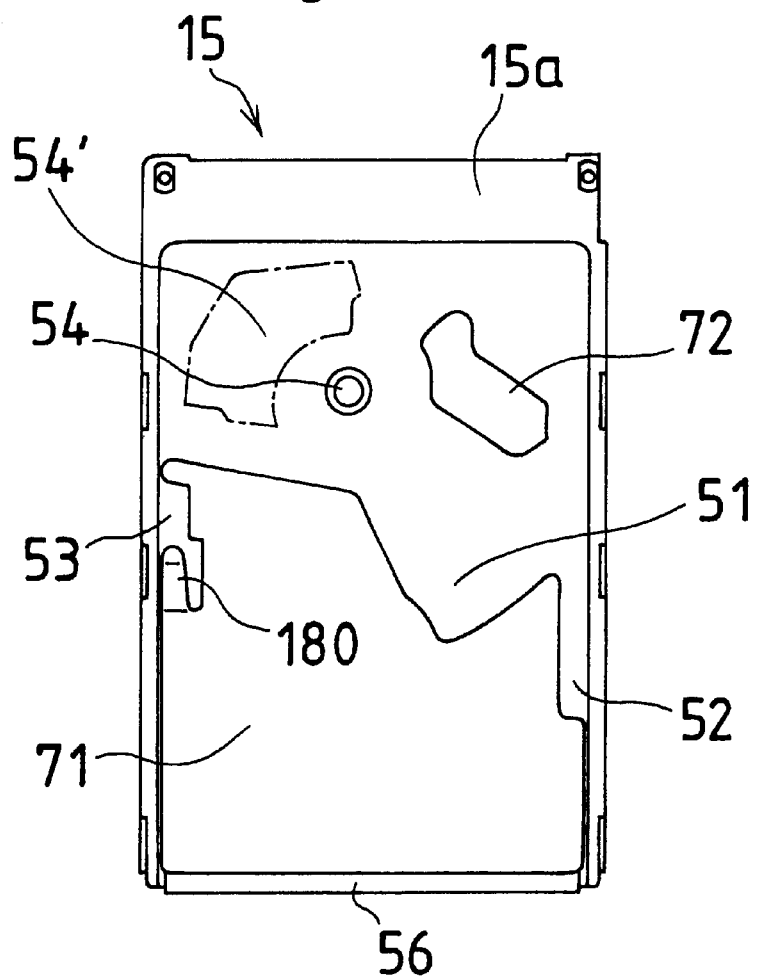
FIG. 20A is a view showing the inner surface of the upper cover of the magnetic recording device according to the present invention.
Figure 20B:
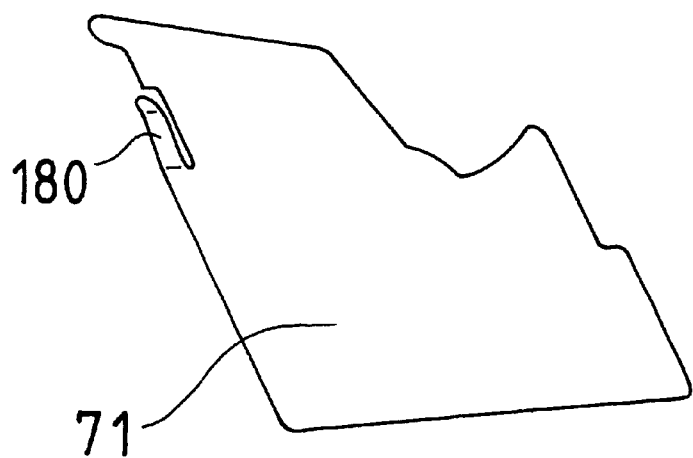
FIG. 20B is a perspective view showing a first reinforcing plate mounted to the upper cover of FIG. 20A.

A description will now be given of the upper cover 15 constituting the case 4 of the magnetic recording device 1 with reference to FIGS. 20A and 20B.

The rear end of the upper cover 15, that is, the end fronting on the cartridge insertion opening 18, is folded back to the inside of the case 4 to provide a fold-back portion 56. The fold-back portion 56 makes the edge of the upper cover 15 rounded for providing extra safety and also for preventing the deformation of the insertion opening 18.

A first reinforcing plate 71 is bonded to the inner surface of the upper cover 15 so as to be placed opposite to the disk drive motor 5, and a second reinforcing plate 72 is bonded to the inner surface of the upper cover so as to be placed opposite to the gear 32 united with the press piece 39 acting on the arm 6a of the write/read head body 6.

The first reinforcing plate 71, formed by a copper material or a non-magnetic material, coveres the top surface of the loaded cartridge 2, serving as a shield plate for electromagnetic shielding.

The first reinforcing plate 71 has a first notch 51 of a substantially triangular shape at a portion corresponding to the rotational range of the arm 6a of the write/read head body 6, a second notch 52 of a substantially rectangular shape at a portion corresponding to the slide range of the slide arm 29 of the main eject mechanism 7 and a third notch 53 of a substantially rectangular shape at a portion corresponding to the vicinity of the rotational axis of the lever member 40 of the sub eject mechanism 8.

When the cartridge 2 is not loaded in the case 4, a cavity is left between the disk drive motor 5 and the upper cover 15. However, since the first reinforcing plate 71 is mounted on the upper cover 15 at a portion opposite to the disc drive motor 5, the deformation of the upper cover 15 hardly occurs though the external force is applied to the above portion of the upper cover 15, as described above.

Since the first reinforcing plate 71 has the first, second and third notches 51, 52 and 53 as described above, there is no fear that the pivotal motion of the arm 6a, the slide motion of the slide arm 29 and the rotational movement of the lever member 40 are hindered by the upper cover 15, though the thickness of the upper cover 15 is increased due to bonding of first reinforcing plate 71 thereto.

The first reinforcing plate 71 further has a projection piece 180 united therewith and extending toward the third notch 53. Incidentally, the projection piece 180 is slightly inclined toward the inside of the case 4 (that is, toward the lower cover 16) as shown in a perspective view of FIG. 20B, without being flush with the first reinforcing plate 71.

When the cartridge 2 is loaded in the case 4, the end of the projection piece 180 presses the surface of the front portion of the cartridge 2 (a portion closer to the connector 24 than the center portion of the disk 10) due to the elasticity of the projection piece 180 toward the lower cover 16 at all times. Thus, in the case of ejecting the cartridge 2, the main eject mechanism 7 and the sub eject mechanism 8 work to push out the cartridge 2 rearward under the condition that the front portion of the cartridge 2 is pressed toward the lower cover 16 with the projection piece 180, resulting in smooth ejection of the cartridge 2. That is, the cartridge 2 can be ejected from the case without causing the front portion of the cartridge to be lifted toward the upper cover 15.

The second reinforcing plate 72 prevents the deformation of the portion of the upper cover 15 opposite to the gear 32. As a result, there is no risk of bending of the upper cover 15 which would cause the upper cover 15 to strike the projection such as the end of the support shaft of the gear 32, and there is no risk of making contact of the upper cover 15 with the gear 32 which would cause the write/read head body 6 to be unlocked.

Since the center portion of the upper cover 15 is somewhat raised by means of drawing processing, a portion different in level is formed in each of the left and right peripheral portions and extends along each of the left and right side edges of the upper cover 15. Thus, these peripheral portions of the upper cover 15 has the strength more than that of the other portion of the upper cover 15 by the presence of such a portion different in level.

Further, a contact portion 54 projects from the inner surface of the upper cover 15 so as to be placed opposite to the upper end face of the head shaft 26 (no reinforcing plate is mounted to this portion). The contact portion 54 may be formed in the manner of pressing a small area of the upper cover 15 inward. The upper end of the head shaft 26 is in contact with the contact portion 54 at all times as shown in a sectional view of FIG. 16. Thus, though an external force is applied to the portion of the upper cover 15 where the contact portion 54 is formed, that portion does not deform because the portion is supported by the head shaft 26.

Further, as shown in FIG. 16, the upper yoke 75 serving as one of components for rotating the arm 6a is in contact with the inner surface of the upper cover 15 at all times. Thus, though an external force is applied to the portion of the upper cover 15 which is opposed to the upper yoke 75 (i.e., an area 54' shown by a chain line in FIG. 20A), that portion does not form because the portion is supported by the upper yoke 75.

As described above, the fixed components such as the head shaft 26 and the upper yoke 75 among the components of the mechanism for driving the head arm having the write/read head at the end are brought into contact with the upper cover 15 to prevent the deformation of the portions of the upper cover 15 which is opposed to these fixed components.

A description will now be given of the unlocking action and the opening action of the shutter 12a resulting from the forward movement of the cartridge 2 in the case 4 with reference to FIGS. 21 to 23.

An unhook spring 57 is a member formed by bending the opposite ends of a substantially V-shaped spring wire material in the same direction, and the opposite bent ends of the unhook spring 57 are inserted into holes 14c, 14d formed on the inside of the side frame 14 so that the unhook spring 57 is mounted to the side frame 14. The unhook spring 57 mounted to the side frame 14 has a projection 58 projecting from the side frame 14 toward the inner side of the case 4 as shown in FIG. 21.

On the other hand, the shell shutter 12a of the cartridge 2 has a guide projection 59 on the reverse side. The guide projection 59 is in engagement with a circular arc-shaped guide slot 60 formed on the reverse side of the shell 11. The shell shutter 12a is energized by an inside spring (not shown) to close the opening 12 (i.e., in a direction shown by an arrow A in FIG. 21) at all times. When the cartridge 2 is on the outside of the case 4, the guide projection 59 is placed at the front end of the guide slot 60 as shown in FIG. 21.

The shell 11 of the cartridge 2 further has a window 61 at a portion making contact with the projection 58 of the unhook spring 57 when the cartridge 2 is moved forward into the case 4.

Figure 23:
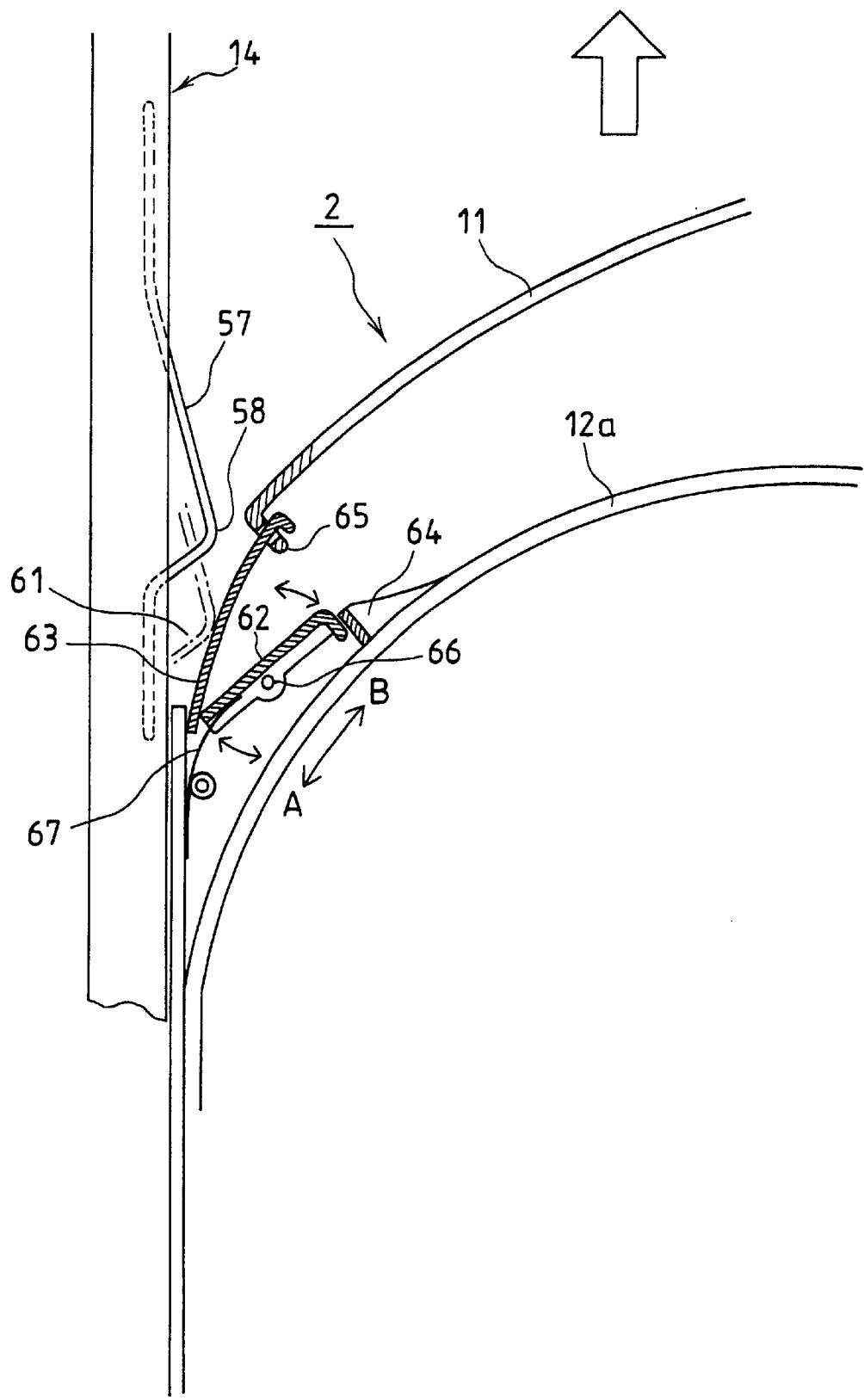
FIG. 23 is a view showing the structure for hooking and/or unhooking the shell shutter of the cartridge for pivotal motion.

As shown in FIG. 23, a portion defining the window 61 in the shell 11 is formed as a fold-back portion 65. The front end of the press plate 63 is engaged with the fold-back portion 65. As a result, the press plate 63 may be pivoted about the fold-back portion 65 to make it possible to close the window 61. The rear end of the press plate 63 makes contact with the inner surface of the shell 11.

The shell 11 further has a burring portion 66. A hook lever 62 is rotatably mounted to the burring portion 66 at the inside of the press plate 63. The front end of the spring 67 makes in engagement with the hook lever 62. The rear end of the spring 67 is anchored to the shell 11.

On the other hand, the hook portion 64 projects from the periphery of the shell shutter 12a so as to be placed opposite to the front end of the hook lever 62. The surface of the hook portion 64 on the closing side of the shell shutter 12a (i.e., on the side shown by an arrow B in FIG. 23) is formed in the shape of a slope.

When the cartridge 2 is inserted into the case 4, both the left and right side faces of the cartridge 2 make contact with the inside of the side frame 14 of the case 4. In course of forward movement of the case 4, the projection 58 of the unhook spring 57 enters the window 61 provided in the side face of the shell 11. Then, the press plate 63 on the shell side is pushed inward. With the above action, the rear end of the hook lever 62 is pivoted inward. Thus, the front end of the hook lever 62 is disengaged from the hook portion 64 of the shell shutter 12a to allow the shell shutter 12a to be freely pivoted in the direction shown by the arrow A in FIG. 21.

At this time, the guide projection 59 (See FIG. 21) of the cartridge 2 reaches the end of the insertion opening 18 of the case 4 and comes into collision therewith. Thus, when the cartridge 2 is pushed in forward, with the movement of the cartridge 2, the guide projection 59 is moved rearward along the guide slot 60, and as a result, the shell shutter 12a is rotated in the direction shown by the arrow A in FIG. 21. Thus, the opening 12 of the shell 11 is opened to allow the access of the head 6b of the write/read head body 6 to the disk 10.

Figure 21:
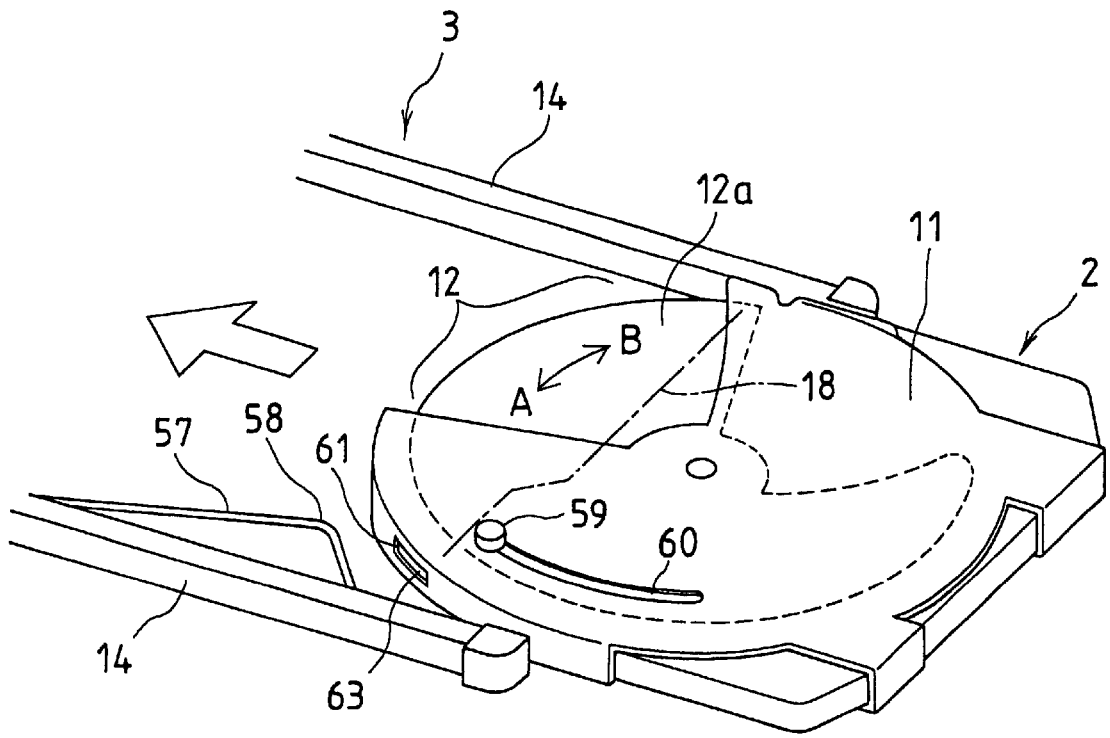
FIG. 21 is a view illustrating the fact that a shell shutter of the cartridge is opened by the insertion of the cartridge into the magnetic recording device.
Figure 22:
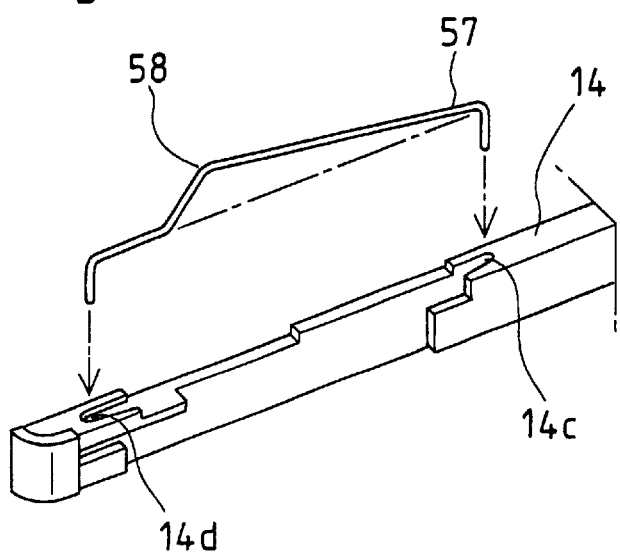
FIG. 22 is a view illustrating the mounting of an unhook spring.

After the ejection of the cartridge 2, the shell shutter 12a is rotated in the direction shown by an arrow B in FIG. 21 by the action of a return spring (not shown) housed in the shell 11 to close the opening 12. Since the hook portion 64 springs up the front end of the hook lever 62 by making use of the slope, the hook lever can return to the close position as shown in FIG. 23.

With the cartridge 2 for containing the disk 10 and the case 4 for loading of the cartridge 2 structured as described above, the press plate 63 of the hook lever 62 for unlocking the shell shutter 12a is placed on the inside of the shell 11, and as a result, there is no fear of pressing the press plate 63 by mistake to open the shutter 12a and put the inside disk 10 out of order while carrying the cartridge 2. Further, since on the case 4, only an unhook spring 58 of such a simple structure has to be mounted, it is possible to simplify the structure of the card type magnetic recording device 1.

An embodiment of the structure for hooking and anchoring the rotational movement of the shell shutter 12a is described above with reference to FIG. 23. Now, another embodiment is described below with reference to FIGS. 24 and 25.

The shell 11 is formed with a pin-shaped burring portion 66, and a plate 162 is rotatably supported by the burring portion 66. A press plate 163 for closing the window 61 of the shell 11 is provided at the edge of the plate 162 which is opposed to the side frame 14. One end of an elongate plate-shaped spring 170 is fixed to the edge of the plate 162 on the inner side of the shell 11. The other end of the spring 170 is in contact with the inner surface of the shell 11. The plate 162 further has a projection 171 extending toward the shell shutter 12a, and an anchor wall 172 is provided at the edge of the projection 171.

Figure 24:
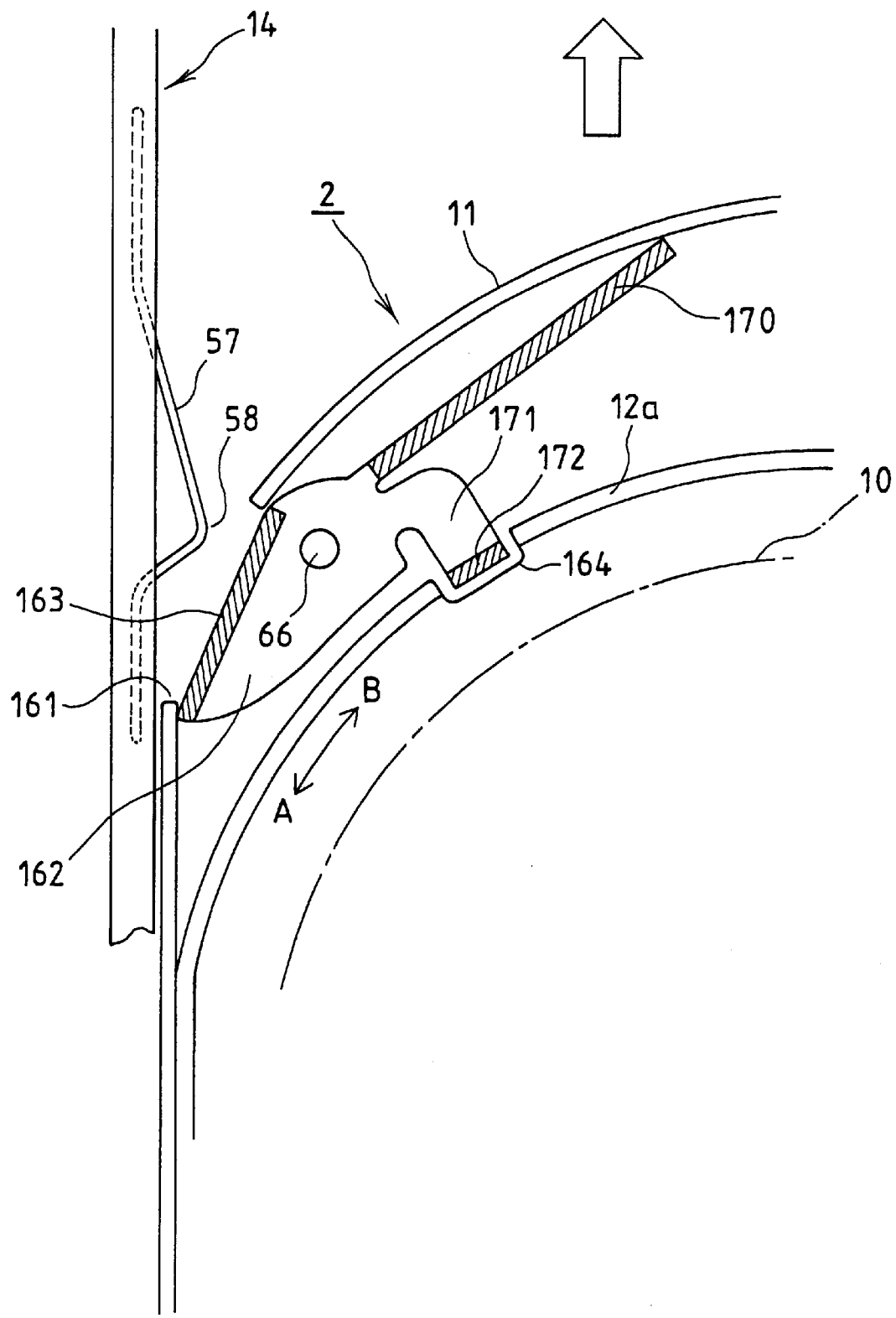
FIGS. 24 and 25 are views showing another embodiment of the structure for hooking and/or unhooking the shell shutter for pivotal motion, in place of the structure shown in FIG. 23.

Any of the press plate 163, the spring 170 and the anchor wall 172 is made of a plate-shaped member having a certain width (height) in a direction perpendicular to the surface of the plate 162, although shown by hatching in FIG. 24. The press plate 163, the spring 170 and the anchor wall 172 are formed as one body together with the plate 162, making these components as one body. However, at least one of the press plate 163, the spring 170 and the anchor wall 172 may be formed separately from the plate 162.

On the other hand, a notch 164 of a size enough to receive the anchor wall 172 of the projection 171 is formed at a part of the shell shutter 12a.

FIG. 24 shows the state where the press plate 163 of the plate 162 is not yet engaged with the projection 58 of the unhook spring 48 though the shell 11 is moved forward in the case 4. In this state, the anchor wall 172 of the plate 162 is fitted into the notch 164 of the shell shutter 12a, and as a result, the shell shutter 12a is prevented from being opened (i.e., the movement in the direction shown by an arrow A in FIG. 24 is prevented).

Figure 25:
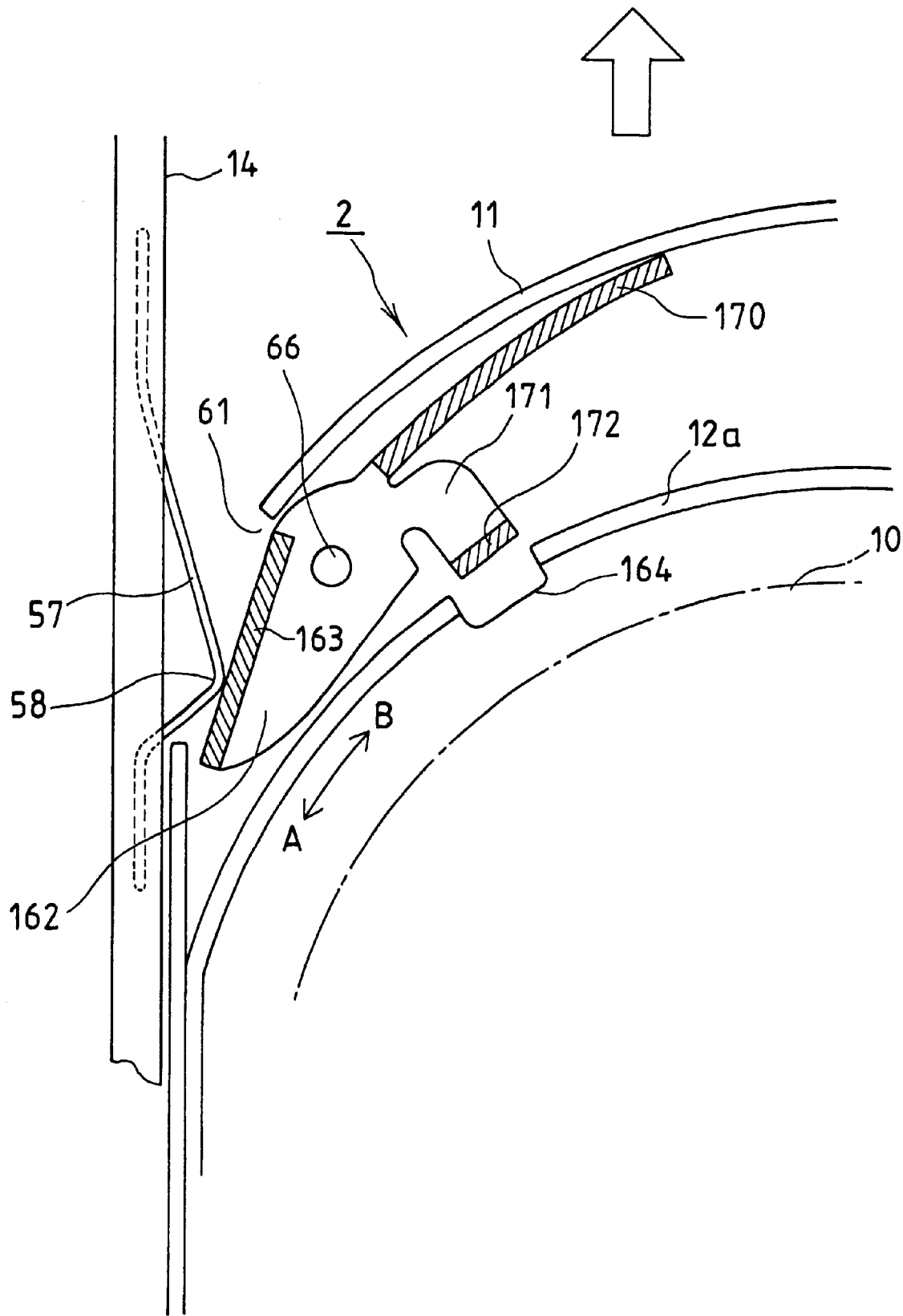

With the more forward movement of the shell 11 from the position shown in FIG. 24, the press plate 163 of the plate 162 makes contact with the projection 58 of the unhook spring 57, as shown in FIG. 25, and is then pressed against this projection, the plate 162 is pivoted counterclockwise in FIG. 25 against the force of the spring 170. As a result, the anchor wall 172 of the plate 162 gets away from the notch 164 of the shell shutter 12a, so that the shell shutter 12a is allowed to be opend.

What is claimed is:

1. A magnetic recording device, comprising:
    a case having a cartridge insertion opening in one end face for allowing the insertion of a cartridge containing a disk serving as a recording medium;
    a frame plate mounted to the inside of said case;
    a disk drive motor mounted to said frame plate to drive said disk;
    a head body mounted to said frame plate to write information on the disk and/or read information from the disk; and
    a case deformation-proof member provided between said case and said frame plate and made movable between a cartridge passing area and an area outside of said cartridge passing area;
    wherein said case deformation-proof member is advanced up to a cartridge loading area when the cartridge is not loaded in the case, while it retracts to the outside of the cartridge loading area when the cartridge is loaded into the case.

2. A magnetic recording device according to claim 1, wherein said case deformation-proof member is forced to retract to the outside of the cartridge loading area by the forward movement of the cartridge which is being inserted into the case.

3. A magnetic recording device according to claim 1, wherein said case deformation-proof member is energized by a spring so that it is advanced into the cartridge passing area, and, when the cartridge is moved forward in the case, said case deformation-proof member is pressed with the front end face of the cartridge, so that it retracts to the outside of the cartridge passing area against the energizing force of the spring.

4. A magnetic recording device according to claim 1, wherein said case deformation-proof member includes a lever member having one end rotatably supported with a shaft provided on the frame plate and the other end serving as a free end.

5. A magnetic recording device according to claim 4, wherein the lever member serving as said case deformation-proof member is placed such that its top surface is close to the case, while at least a part of its bottom surface is in contact with the frame plate.

6. A magnetic recording device according to claim 5, wherein the free end of the lever member serving as said case deformation-proof member is advanced up to a position above the disk drive motor mounted to the frame plate when the cartridge is not loaded in the case, and a portion of the lever member which reaches the position above the disk drive motor has a recess portion for preventing the lever member from making contact with the disk drive motor.

7. A magnetic recording device according to claim 4, wherein the lever member serving as said case deformation-proof member continues to exert a force on the cartridge to push back the cartridge toward the cartridge insertion opening by a force of a spring while the cartridge is loaded in the case.

8. A magnetic recording device according to claim 7, wherein said case incorporates a main eject mechanism and a sub eject mechanism both for ejecting the loaded cartridge, and said lever member also serves as said sub eject mechanism.

9. A magnetic recording device according to claim 7, wherein the energizing force of said spring varies in accordance with the movement of the cartridge.

10. A magnetic recording device according to claim 9, wherein said spring is composed of a plurality of springs.

11. A magnetic recording device according to claim 9, wherein said spring is composed of at least two pieces of spring member and is operated such that both two pieces of spring member exert an energizing force on the cartridge in the initial stage of ejection, but only one piece of spring member exerts an energizing force on the cartridge from the intermediate stage of ejection.

12. A magnetic recording device according to claim 11, wherein said spring is composed of a first spring member and a second spring member and is operated such that the first and second spring members exert an energizing force on the cartridge to press the cartridge rearward with a relatively large force in the first half stage of retreat of the cartridge which is being ejected from the case, and only the first spring member exerts an energizing force on the cartridge to press the cartridge rearward with a relatively small force, while the second spring member does not exert such an energizing force, in the second half stage of retreat of said cartridge.

13. A magnetic recording device according to claim 1, wherein said case deformation-proof member includes a plate-shaped member extending in parallel to the cross direction of the case, and the opposite ends of said member are supported with the side walls of a case body such that said member may be pivoted freely between the position of a rising posture and the position of a fallen-down posture.

14. A magnetic recording device according to claim 13, wherein the plate-shaped member serving as said case deformation-proof member is placed in a rising posture such that its top surface is close to the case, while at least a part of its bottom surface is in contact with the frame plate.

15. A magnetic recording device according to claim 14, wherein at least a portion of the plate-shaped member serving as said case deformation-proof member is placed above the disk drive motor mounted to the frame plate, and a portion of the surface of said plate-shaped member, which is opposed to the disk drive motor when said plate-shaped member is placed in the rising posture, has a recess portion for preventing said portion of the surface from making contact with the disk drive motor.

16. A magnetic recording device according to claim 1, wherein one or a plurality of pieces of reinforcing plates are locally bonded to portions of the inner surface of said case other than portions corresponding to the rotational or slide range of a rotational or slide member in the case.

17. A magnetic recording device according to claim 16, wherein a piece of said reinforcing member is bonded to the inner surface of the case so as to cover at least a part of said disk drive motor.

18. A magnetic recording device according to claim 17, wherein the piece of said reinforcing plate is formed by a copper material or a non-magnetic material and also serves as a shield late for electromagnetic shielding.

19. A magnetic recording device according to claim 17, wherein a projection piece is formed in the piece of said reinforcing plate as one body and extends diagonally toward the inside of the case, and said projection piece presses the surface of a front portion of the cartridge in the case by the elasticity thereof.

20. A magnetic recording device according to claim 1, wherein a press plate is bonded to the inner surface of said case so as to be placed opposite to a projection such as a shaft.

21. A magnetic recording device according to claim 1, wherein said case directly makes contact with a yoke which is one of components of the drive motor of the head body for writing information on the disk and/or reading the information from the disk.

* * * * *

UNITED STATES PATENT AND TRADEMARK OFFICE
CERTIFICATE OF CORRECTION

PATENT NO. : 6,452,741 B1
DATED : September 17, 2002
INVENTOR(S) : Katsutoshi Mukaijima et al.

It is certified that error appears in the above-identified patent and that said Letters Patent is hereby corrected as shown below:

<u>Title page, Item [54] and Column 1, lines 1 and 2,</u>
The title of the invention should be -- MAGNETIC RECORDING DEVICE -- and not "MAGNETIC RECORDING DEVICE WITH DEFORMATION-PROOF ELEMENT"

<u>Column 12,</u>
Line 12, "coveres" should be -- covers --

<u>Column 15,</u>
Line 27, "opend" should be -- opened --

<u>Column 17,</u>
Line 11, "late" should be -- plate --.

Signed and Sealed this

First Day of April, 2003

JAMES E. ROGAN
*Director of the United States Patent and Trademark Office*